(12) United States Patent
Chan et al.

(10) Patent No.: US 11,681,551 B2
(45) Date of Patent: *Jun. 20, 2023

(54) RESOURCE TRUST MODEL FOR SECURING COMPONENT STATE DATA FOR A RESOURCE USING BLOCKCHAINS

(71) Applicant: EBAY INC., San Jose, CA (US)

(72) Inventors: Michael Chan, Cupertino, CA (US); Derek Chamorro, Austin, TX (US); Venkata Siva Vijayendra Bhamidipati, Milpitas, CA (US); Arpit Jain, Milpitas, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,649

(22) Filed: Oct. 12, 2021

(65) Prior Publication Data
US 2022/0035623 A1 Feb. 3, 2022

Related U.S. Application Data

(63) Continuation of application No. 16/384,362, filed on Apr. 15, 2019, now Pat. No. 11,188,384.
(Continued)

(51) Int. Cl.
*G06F 9/46* (2006.01)
*G06F 9/50* (2006.01)
(Continued)

(52) U.S. Cl.
CPC ............ *G06F 9/50* (2013.01); *G06F 8/65* (2013.01); *G06F 16/1805* (2019.01); *H04L 9/0643* (2013.01); *H04L 9/50* (2022.05)

(58) Field of Classification Search
CPC .......... G06F 9/50; G06F 8/65; G06F 16/1805; G06F 21/64; G06F 21/16; G06F 21/57; H04L 9/0643; H04L 9/50; H04L 9/3239
See application file for complete search history.

(56) References Cited

U.S. PATENT DOCUMENTS

| 11,188,384 B2 | 11/2021 | Chan et al. |
| 2008/0195839 A1* | 8/2008 | Nuyens .............. G06F 15/7867 712/E9.071 |

(Continued)

FOREIGN PATENT DOCUMENTS

| CN | 107730279 A | 2/2018 |
| WO | 2020/096713 A1 | 5/2020 |

OTHER PUBLICATIONS

CryptoTec AG, "Blockchain for the Automotive Industry", Retrieved from the Internet URL : <https://test.cryptotec.com//wp-content/uploads/2018/01/Blockchain_for_Automotive_CryptoTec_EN.pdf>, Jan. 1, 2018, 5 pages.
International Search Report received for PCT Application No. PCT/US2019/053815, dated Nov. 22, 2019, 4 pages.
(Continued)

*Primary Examiner* — Tuan C Dao
(74) *Attorney, Agent, or Firm* — Shook, Hardy & Bacon LLP

(57) ABSTRACT

Technologies are shown for storing sub-component state data for a resource on a blockchain involving generating a resource data block that corresponds to a resource that includes links that correspond to sub-components of the resource, generating a first sub-component state data block for a sub-component of the resource on a blockchain that includes first state data for the first sub-component, and setting the link for the sub-component to reference the first sub-component state data block. Subsequently, a second sub-component state data block can be generated for the sub-component with second state data and the second sub-component state data block linked to the first sub-component state data block.

17 Claims, 15 Drawing Sheets

Related U.S. Application Data

(60) Provisional application No. 62/757,033, filed on Nov. 7, 2018.

(51) Int. Cl.
    *G06F 16/18*     (2019.01)
    *H04L 9/06*     (2006.01)
    *G06F 8/65*     (2018.01)
    *H04L 9/00*     (2022.01)

(56) References Cited

U.S. PATENT DOCUMENTS

| | | | |
|---|---|---|---|
| 2016/0119198 A1 | 4/2016 | Kfir et al. | |
| 2017/0017936 A1* | 1/2017 | Bisikalo | G06Q 20/308 |
| 2017/0118708 A1 | 4/2017 | Alon et al. | |
| 2017/0188213 A1* | 6/2017 | Nirantar | H04L 67/564 |
| 2017/0243025 A1* | 8/2017 | Kurian | H04L 9/3236 |
| 2017/0243213 A1* | 8/2017 | Castinado | H04W 12/06 |
| 2017/0257358 A1 | 9/2017 | Ebrahimi et al. | |
| 2018/0097635 A1 | 4/2018 | Moses | |
| 2018/0137306 A1* | 5/2018 | Brady | H04L 9/0643 |
| 2018/0167198 A1 | 6/2018 | Muller et al. | |
| 2018/0173568 A1* | 6/2018 | El-Moussa | G06F 9/46 |
| 2018/0260909 A1* | 9/2018 | Li | G06Q 10/067 |
| 2019/0164241 A1* | 5/2019 | Bässler | G06Q 50/18 |
| 2019/0347657 A1* | 11/2019 | Guo | G06Q 20/10 |
| 2019/0379754 A1* | 12/2019 | Krishnaswamy | H04L 67/289 |
| 2020/0142739 A1 | 5/2020 | Chan et al. | |

OTHER PUBLICATIONS

International Written Opinion received for PCT Application No. PCT/US2019/053815, dated Nov. 22, 2019, 6 pages.

Zhang et al., "FHIRChain: Applying Blockchain to Securely and Scalably Share Clinical Data", Retrieved from the Internet: <https://www.sciencedirect.com/science/article/pii/S2001037018300370>, Jul. 29, 2018, pp. 267-278.

International Preliminary report received for PCT Patent Application No. PCT/US2019/053815, dated May 20, 2021, 8 pages.

Boudguiga et al., "Towards Better Availability and Accountability for IoT Updates by means of a Blockchain", 2017 IEEE European Symposium on Security and Privacy Workshops (EuroS&PW), Apr. 2017, pp. 50-58.

Final Office Action received for U.S. Appl. No. 16/384,362, dated Apr. 6, 2021, 22 pages.

Non-Final Office Action received for U.S. Appl. No. 16/384,362, dated Nov. 5, 2020, 18 pages.

Notice of Allowance received for U.S. Appl. No. 16/384,362 dated Jul. 26, 2021, 10 pages.

Baker, "Irreproducible Biology Research costs put at $28 Billion per year", Retrieved from the Internet URL :<https://www.nature.com/news/irreproducible-biology-research-costs-put-at-28-billion-peryear-1.17711>, Jun. 9, 2015, 7 pages.

Resnik et al., "Fraudulent Human Embryonic Stem Cell Research in South Korea: Lessons Learned", Retrieved from the Internet URL :<https://www.ncbi.nlm.nih.gov/pmc/articles/PMC1892198/>, Jun. 15, 2007, 6 pages.

Service, "Scientific Misconduct. Bell Labs fires star Physicist found guilty of Forging Data", Retrieved from the Internet URL :<https://www.ncbi.nlm.nih.gov/pubmed/12364753>, Oct. 4, 2002, 1 page.

* cited by examiner

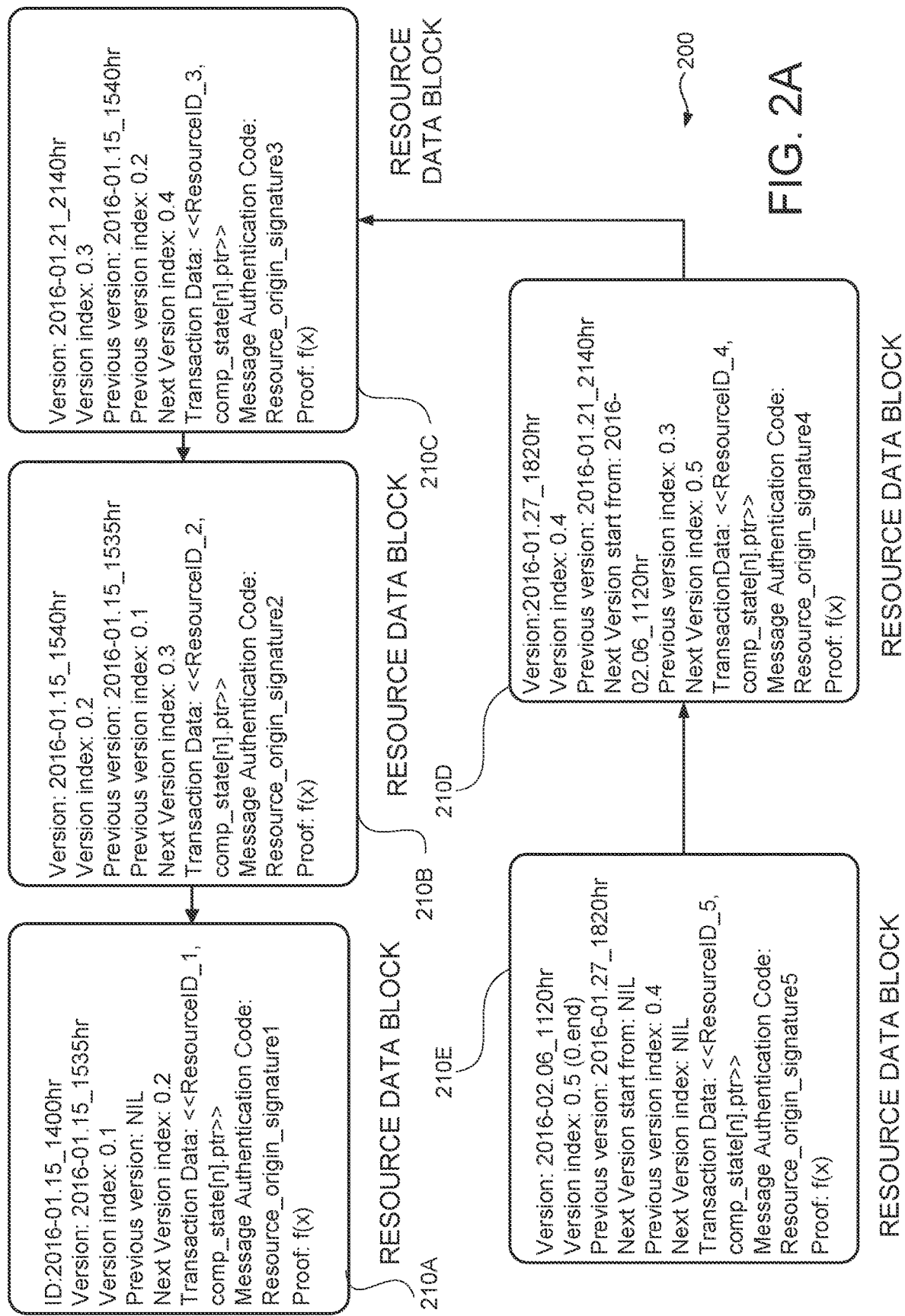

RESOURCE TRUST MODEL FOR SECURING COMPONENT STATE DATA FOR A RESOURCE USING BLOCKCHAINS

CROSS REFERENCE TO RELATED APPLICATIONS

This application claims the benefit of U.S. Provisional Patent Appl. No. 62/757,033 for "Blockchain Forensics and Blockchain Platforms" filed Nov. 7, 2018, herein incorporated by reference in its entirety for all purposes. This application is a continuation of U.S. patent application Ser. No. 16/384,362 for "Resource Trust Model for Securing Component State Data for a Resource Using Blockchains" filed Apr. 15, 2019, issued as U.S. Pat. No. 11,188,384, herein incorporated by reference in its entirety for all purposes.

BACKGROUND

Systems are typically constructed of many components, such as data subsets, subsystems, and modules. For example, a database is often composed of many data subsets. In another example, a computer typically includes multiple hardware subsystems, e.g. motherboard, memory, BIOS, communication devices, etc., and software subsystems, e.g. operating system (OS), device drivers, libraries, etc. In yet another example, an application often includes many modules and libraries.

Typically, many components of a system can be added, updated or replaced. For example, a data base can have many data subsets or libraries that can be modified. In a computer, a BIOS can be updated, a memory module replaced, or an operating system can be replaced with a new version or patched. An application can be updated. Libraries can be modified. Device drivers can be installed, modified or removed.

Often, many different entities can be involved in adding modifying components in a system. For example, an original equipment manufacturer (OEM) for a computer typically adds the computer's motherboard, memory module and operating system. However, the operating system is often updated by the maker of the OS or device drivers are added by manufacturers who provide devices obtained and attached by users. As components are added or changed, it can be difficult to securely record the changes made by multiple entities.

Systems can often be compromised or corrupted when changes are introduced. Therefore, it can sometimes be beneficial to be able to trace the changes to determine where a system compromise or corruption was introduced. Currently, it can be difficult or impossible to know what changes have been made to a system over its lifecycle.

It is with respect to these and other considerations that the disclosure made herein is presented.

SUMMARY

Technologies are disclosed regarding a resource trust model for securely recording component installations and updates for a resource, such as a system, database, or application, using a blockchain, where an originator of the resource creates a resource data block for the resource on a blockchain. An addition or modification of a component for the resource can be recorded in a component state data block on a blockchain that is linked to the resource data block for the resource. Subsequent modifications to the component can also be recorded in a component state data block. Modifications to the resource are securely recorded on the blockchain and can be traced.

A component state data blockchain can be established by an originator or source of component state data, such as digital audio, video, photographs, images, text or a streaming service for digital video, photographs, images, or text. Alternatively, component state data blocks can be generated the source and linked to an existing blockchain, such as the ETHERIUM blockchain.

The source generates a component state data block that includes the component state data and includes methods for accessing the component state data. The component state data block can also include one or more required uses define by the source for the component state data, such as a particular user or transferee, a number of uses, a number of users, a geographical limit on use, or a device limitation on use.

Examples of the disclosed technology concern methods, systems and media for storing component state data for components of a resource that involve generating a resource data block that corresponds to a resource, where the resource data includes one or more links and each link corresponds to one of one or more components of the resource. This example of the disclosed technology also involves generating a first component state data block for a first component of the resource on a blockchain, where the first component state data block for the first component includes a first set of state data corresponding to the first component, and setting the link that corresponds to the first component to reference the first component state data block.

In certain examples, the step of generating a resource data block that corresponds to a resource involves generating a resource data block that corresponds to a resource by a resource originator entity and the step of generating a first component state data block for a first component of the resource on a blockchain includes requiring the first component state data block to be signed by the resource originator entity.

Other examples involve generating a second component state block for the first component, the second component state block for the first component including second state data corresponding to the first component and linking the second component state data block to the first component state data block.

In particular examples, the step of generating a resource data block that corresponds to a resource involves generating a resource data block that corresponds to a resource by a resource originator entity and the step of generating a second component state data block for the first component comprises generating the second component state block for the first component by a component provider entity. These examples also include requiring the second component state data block to be signed by the resource originator entity and the component provider entity.

Still other examples involve, generating a second component state data block for a second component on the blockchain, the second component state data block for the second component including first state data for the second component and setting the link in the resource data block that corresponds to the second component to reference the first component state data block for the second component on the blockchain.

In yet another example, the step of generating a resource data block that corresponds to a resource, where the resource data includes one or more links and each link corresponds to one of one or more components of the resource includes generating a null component state data block for each of the one or more components of the resource and, for each one of the one or more components, setting the link that corresponds to the component to reference the null component state data block for the component. In this example, the step of setting the link that corresponds to the first component to reference the first component state data block involves linking the first component state data block to the null component state data block for the first component.

In various examples, the resource can be a system and the first component is a sub-component of the system, the resource can be a service and the first component is a component of the service, the resource can be a database and first component is a subset of data, the resource can be an operating system and the first component is one a library, a management subsystem or a device driver, or the resource can be an application and the first component is an update to the application.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2A is a data architecture diagram showing an illustrative example of a resource data blockchain and component state data blockchain securing resource and component state data for resources;

DETAILED DESCRIPTION

Figure 1:
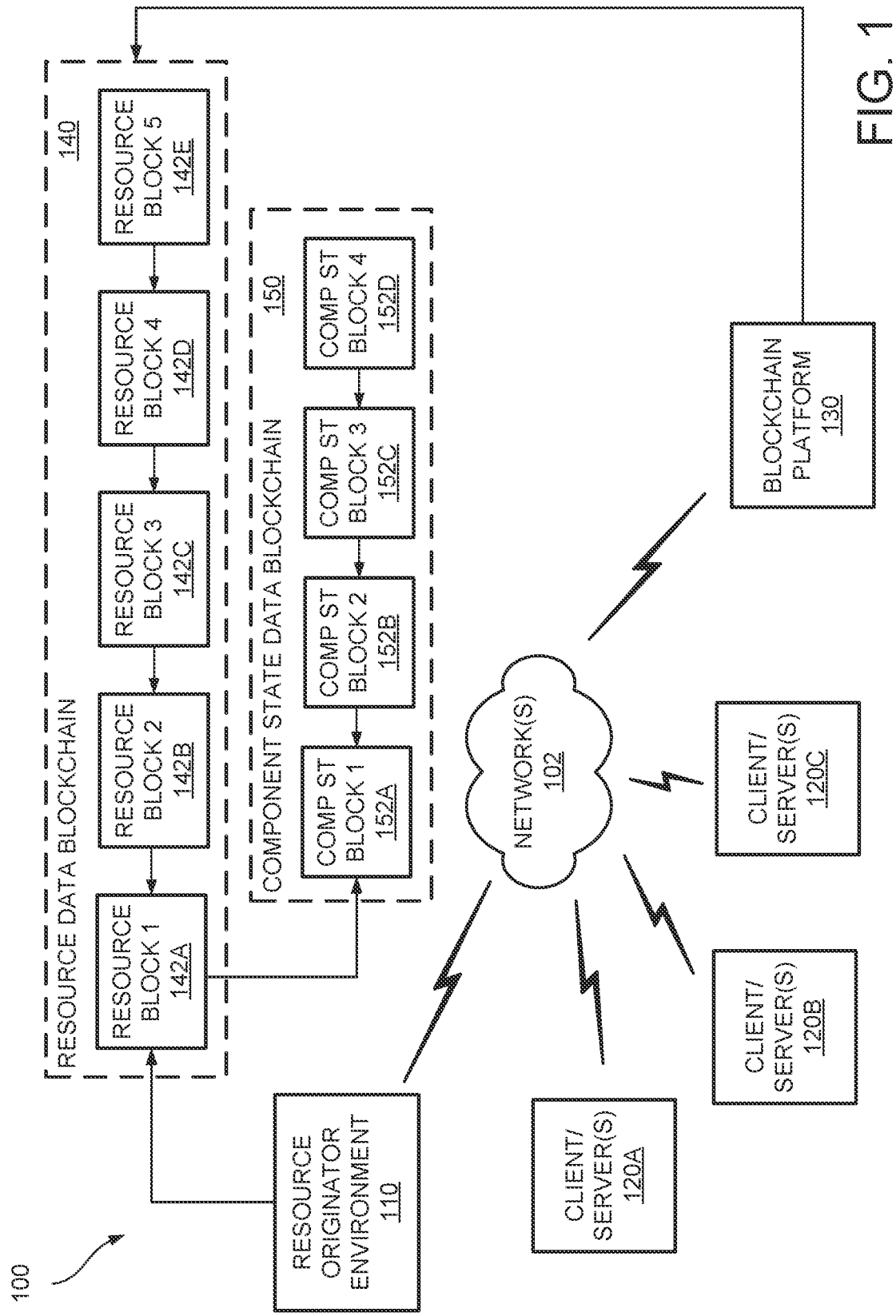
FIG. 1 is an architectural diagram showing an illustrative example of a system for a storing component state data for components of a resource using a blockchain.

In the context of resource state data, it is sometimes advantageous for a resource originator entity or originator of a resource (such as system hardware, services, databases, drivers or applications) to securely control and maintain a record of state data for one or more components of the resource (such as subsystems, data sets, data or code modules, libraries or key data).

For example, when a problem is discovered in a component in a resource, e.g. the component is found to have failed or has been corrupted or compromised, it can be highly useful to be able to trace the history of the component to determine the source of the problem and evaluate the impact of the problem. When a memory module fails, for example, the component state data for the module can be useful to identify a source for the faulty module. Likewise, if a device driver is found to be defective, the component state data can be useful to isolate when the device driver was installed in the resource and the resource originator entity that provided the device driver in order to isolate the fault. In another example, when a component is found to be compromised, it can be important to examine the history of the component to determine when the component was compromised and the resource originator entity for the compromised component in order to isolate the security breach.

It can also be beneficial for the component state data to be securely maintained and immutable so that the data cannot be changed and is therefore reliable for auditing purposes. Further, it can be beneficial for data regarding the components provisioned on the system to be readily accessible to many entities that may use the data for auditing, fault or security breach isolation or other purposes.

Currently, there do not appear to be good conventional solutions for monitoring the state of a resource and its components. Some component state data can be collected and maintained by an original source for a resource, such as through product registrations or account logs. However, these approaches are generally fragmented among multiple entities, such as the original source of the resource and multiple different providers of components.

Such state data as does exist may not include historical data to enable forensic tracing of a component. Further, the security of the state data is typically unknown to outside observers and, therefore, not known to be reliable. Further, any component data that does exist among the multiple entities is typically not accessible outside of the entity that maintains that particular component data.

In general terms, the disclosed technology utilizes one or more blockchains to maintain a resource data block pertaining to a resource that includes data for one or more components of the resource. When a component is provisioned in the resource, a component state data block is created with metadata for the provisioned component and stored in a blockchain and a link to the component state data block for the component is stored in the resource data block. When the component is updated, replaced or otherwise modified, another component state data block is created with metadata for the component, such as data indicating the modification to the component and an identifier for the entity making the modification.

The following Detailed Description describes technologies for securely maintaining a record of state data for one or more components of a resource, where a resource originator entity for the resource can create a resource data block on a blockchain that can include a definition of the components of the resource. The resource data block can also include a link for each component to a component state data blockchain that stores state data relating to the component and historical data regarding modifications to the component of the resource.

For example, a computer manufacturer can create a resource data block that includes a serial number for a computer that the manufacturer has produced along with a definition of the components of the computer, e.g. mother board, memory components, power supply, mass storage devices, sensors, user interfaces, networking devices, video card, operating system, applications, etc. When a component is added to the resource, e.g. a memory card, a component state data block is created that includes metadata for the component, e.g. manufacturer, model number, serial number, etc. A link to the component state data block for the component is stored in the resource data block. When the component is modified or replaced, then a new component state data block is created with metadata describing the modification and a link to the new component state data block is stored in the resource data block.

Note that, in some scenarios, different entities can provide the components for the resource. As the resource is provisioned with a component, the provider of the component can, in some examples, create the component state data block and update the resource data block with the link to the component state data block. In some examples, modifications or additions to the resource data block for a resource or additional component state data blocks can require a signature of the resource originator entity.

The resulting resource data block and associated component state data blocks can provide a record of the components provisioned on a resource along with the component state data for the components and a traceable history for the components.

A resource data blockchain and component state data blockchain can be established by resource originator entity for a resource, such as an original equipment manufacturer (OEM), an operating system provider, or an application developer. Alternatively, resource data blocks and component state data blocks can be generated by the resource originator entity and linked to an existing blockchain, such as the ETHERIUM blockchain.

The resource data in a resource data blockchain or the component state data in a component state data blockchain can be encrypted so that it can only be accessed through the methods of the blocks. Other content in the block, such as the methods, can also be encrypted to prevent unauthorized access to the content or to control access to the content. For example, the resource data or component state data can be encrypted using a public-private key pair, where a public key for the resource originator entity is used to encrypt data and a corresponding private key is used to decrypt data. In some examples, another entity, such as a component provider, can be provided with a key to access the data.

A technical advantage of the disclosed resource trust model for component state data technology includes securely maintaining the data on a blockchain that can be widely accessed through the internet. Another technical advantage of the disclosed component state data technology is the distributed nature of the blockchain, which prevents an unauthorized entity from modifying or corrupting the component state data at any single point. Other technical effects other than those mentioned herein can also be realized from implementation of the technologies disclosed herein.

By the use of the technologies described herein, one or more blockchains can be used to securely maintain traceable state data regarding a resource and its components. In a resource data block on a blockchain, data regarding a resource is stored that can include information regarding the resource along with information regarding one or more components for the resource, which can include a link to a component state data block for the component that contains component state data. The component state data blocks can be stored in a component state data blockchain to securely and immutably store component state data in a manner that provides wide access to the data so that the component state data can be readily accessed and traced by users with network access to the blockchain.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a component state data blockchain ledger will be described. As will be described in more detail below with respect to the figures, there are a number of applications and services that may embody the functionality and techniques described herein.

FIG. 1 is an architectural diagram showing an illustrative example of a component state system 100 utilizing a resource data blockchain 140 and a component state data blockchain 150. A resource data blockchain can be utilized to securely maintain resource data regarding a resource and a component state data blockchain can be utilized to securely maintain state data relating to components of a resource. The resource data block can also be utilized to control access to the resource data and component state data as well as control modifications to the data. In the embodiment of FIG. 1, blockchains 140 and 150 can each be a publicly available blockchain that supports scripting, such as the ETHEREUM blockchain, which supports a SOLIDIFY scripting language, or BITCOIN, which supports a scripting language called SCRIPT. Blockchains 140 and 150 can also each be a private blockchain, or a combination of public and private blockchains can be utilized. Resource data blocks 142 and component state data blocks 152 can also reside on the same blockchain.

A resource originator environment 110, such as a client device, one or more servers, or remote computing resources, is controlled by a resource originator entity that creates the resource. In one example, resource originator environment 110 initiates a resource data blockchain 140 by created genesis block 142A and initiates a component state data blockchain 150 by creating genesis block 152A. In other examples, the resource data blocks 142 and component state data blocks 152 can be added to an existing blockchain.

For a resource data blockchain, resource data block 142A, in this example, can include resource data regarding a resource, such as a model number, a manufacturer or developer, a serial number, an activation code, a version number or other descriptive data. The resource data block can also include data regarding one or more components of the resource, such as a type of component and a link to a component state data block with state information regarding the component.

For a component state data blockchain, component state data block 142A, in this example, can include component state data for a component, such as the manufacturer, developer or supplier, a serial number or activation code, a version number, update identifier, or other descriptive data. The component state data block 142 can also include a link to another component state data block relating to a previous component or version of the component.

In some embodiments, the resource originator environment 110 can be replaced by another computing node, such as a computer on a peer-to-peer network, or other computing device.

In the example of FIG. 1, the resource data is provided by resource originator environment 110 and secured on resource data blockchain 140. The component state data can be provided by resource originator environment 110 or by a supplier of a component and secured on component state data blockchain 140. The information in the resource data blocks 142 and component state data blocks can be made accessible to other entities, such as client/servers 120A, 120B or 120C or blockchain platform 130. In this example, the client/servers 120 can communicate with resource originator environment 110 as well as a network of servers for blockchain platform 130 that supports and maintains blockchains 140 and 150. For example, the ETHERIUM blockchain platform from the ETHERIUM FOUNDATION of Switzerland provides a decentralized, distributed computing platform and operating system that provides scripting functionality.

In one example, resource originator environment 110 owns and controls the resource data blocks 142 in resource data blockchain 140. Each resource data block 142 includes resource data relating to the resource that is defined by the resource originator entity using resource originator environment 110. For example, the resource originator entity can define a serial number and an array of components for the resource including a link to a component state data block for each component.

In this example, resource originator environment 110 can also own and control the component state data blocks 152 in component state data blockchain 150. Each component state data block 152 includes component state data relating to the component, such as version or update number, revision date, supplier identifier, etc. When a component is provisioned for the resource, a component state data block is created and the link corresponding to the component in the resource data block set to link to the component state data block. When the component is modified or replaced, a new component state data block is created, linked to the previous component state data block and the link corresponding to the component in the resource data block set to link to the new component state data block.

Although resource originator environment 110, at least initially, maintains control over the component state data, the component state data blockchain 150 can be made accessible to other entities, such as client/servers 120, so that supplier entities can provide component state data stored in the blocks in the blockchain. For example, a supplier entity providing a component or a revision to a component, using a client/server 120, can create a component state data block relating to the component or the revision.

In some examples, methods in the component state data blocks can provide for the resource originator entity to maintain control over the component state data blocks by requiring the resource originator entity's signature on a new component state data block. In other examples, method in the component state data blocks can require both the resource originator entity's signature and the supplier entity's signature on a new component state data block.

In some examples, the resource state data blockchain 140 and component state data blockchain 150 may be viewable to other entities through the use of applications that can access blockchain information. By providing access to the resource state data blockchain 140 and component state data blockchain 150, this approach allows users to readily access resource data and component state data maintained on the resource state data blockchain 140 and component state data blockchain 150 under the control of the resource originator entity, e.g. the user of resource originator environment 110.

In another example, aspects of the component state data blockchain 140 may be restricted to being viewable only to entities that are authorized to access the blockchains 140 and 150, such as resource originator environment 110 or component supplier entities, e.g. authorized users of one of client/servers 120. By restricting access to the blockchains 140 and 150, a resource originator entity can preserve greater control or security over the resource and component state data.

FIG. 2A is a data architecture diagram illustrating a simplified example of a resource data blockchain ledger 200 based on the blocks 142A-E of the resource data blockchain ledger 140 of FIG. 1. The resource data blockchain ledger 200 example of FIG. 2A is simplified to show block headers, metadata and signatures of blocks 210A-E in order to demonstrate storage of resource data using a blockchain. In outline, a blockchain ledger may be a globally shared transactional database. Signatures can, in some examples, involve all or part of the data stored in the data the blocks 142A-E and can also involve public key addresses corresponding to resource origination entities involved in the creation of resources.

The blockchain ledger 200 may be arranged as a Merkle tree data structure, as a linked list, or as any similar data structure that allows for cryptographic integrity. The blockchain ledger 200 allows for verification that the resource data, and similarly component state data on component state data blockchain 150, has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of resource data blockchain 200 in the example of FIG. 2A shows securing resource data with a new resource data block on the blockchain. In one example, resource originator environment 110 of FIG. 1 provides the resource data and data identifying an owner of the resource data, an identifier for the resource, and a one or more records relating to components of the resource, which can include an identifier for a component and a link to a component state data block with state data for the component when it creates resource data block 210A. The resource originator environment 110 signs the resource data block 210A and the blockchain system within which blockchain 200 is created verifies the resource data block based on a proof function.

Note that the component state data blockchain 150 illustrated in FIG. 1 can take a similar form with component state data blocks 152 that can include data pertaining to the corresponding component, such as a serial number, model or version number, date of installation, etc. Component state data blocks 152 for successive versions, updates or replacements for the component can be linked together on the same or a different blockchain such that a history of the component in the resource is immutably and traceably stored using a blockchain.

Note that a variety of approaches may be utilized that remain consistent with the disclosed technology. In some examples relating to resource data and component state data, the user of resource originator environment 110 is a required entity or the only entity permitted to verify or validate resource data blocks 142 or component state data blocks 152. In other examples, other entities, such as authorized component supplier entities, can verify or validate component state data blocks 152.

In the example of FIG. 2A, resource data blocks 210 of resource data blockchain 200 include resource data, such as a resource identifier and components links for components of the resource, along with a signature of a resource originator. In the example of FIG. 2A, each resource data block 210 contains an array of component state pointers comp_state[n].ptr that can link to corresponding component state data blocks that include state data for components of the resource. Note that a resource originator can create resource data blocks with different numbers of components depending upon the resource.

To add a resource data block with new resource data, the resource originator environment 110 creates resource data block 210B, which identifies the component state data, e.g. ResourceID 2, and the component state array, e.g. comp_state[n], and links block 210B to block 210A. The resource originator environment 110 signs resource data block 210B and commits block 210B to blockchain 200 for verification by the blockchain platform.

To add more resource data blocks for an additional resource, resource originator environment 110 creates resource data block 210C to secure resource data for ResourceID_3 along with a component state array. Similarly, resource data block 242D is created by resource originator environment 110 to store the resource data for ResourceID_4 and resource data block 242E is created to store the resource data for ResourceID_5.

Also, the pointer can be created with a null link that is updated to point to a component state data block when the component is provisioned in the resource. For example, the resources originator entity can be an OEM manufacturer for a system that has n components, where some or all of the pointers are null links. When the resource originator entity provisions a main controller board for the resource, it creates a component state data block that includes data regarding the main controller board and sets the corresponding pointer in the component state array to point to the component state data block. In some examples, the component state array can also include definition or requirement data that identifies the corresponding component and characteristics for the component, e.g. a main controller board with a 2 GHz clock rate.

Figure 2B:
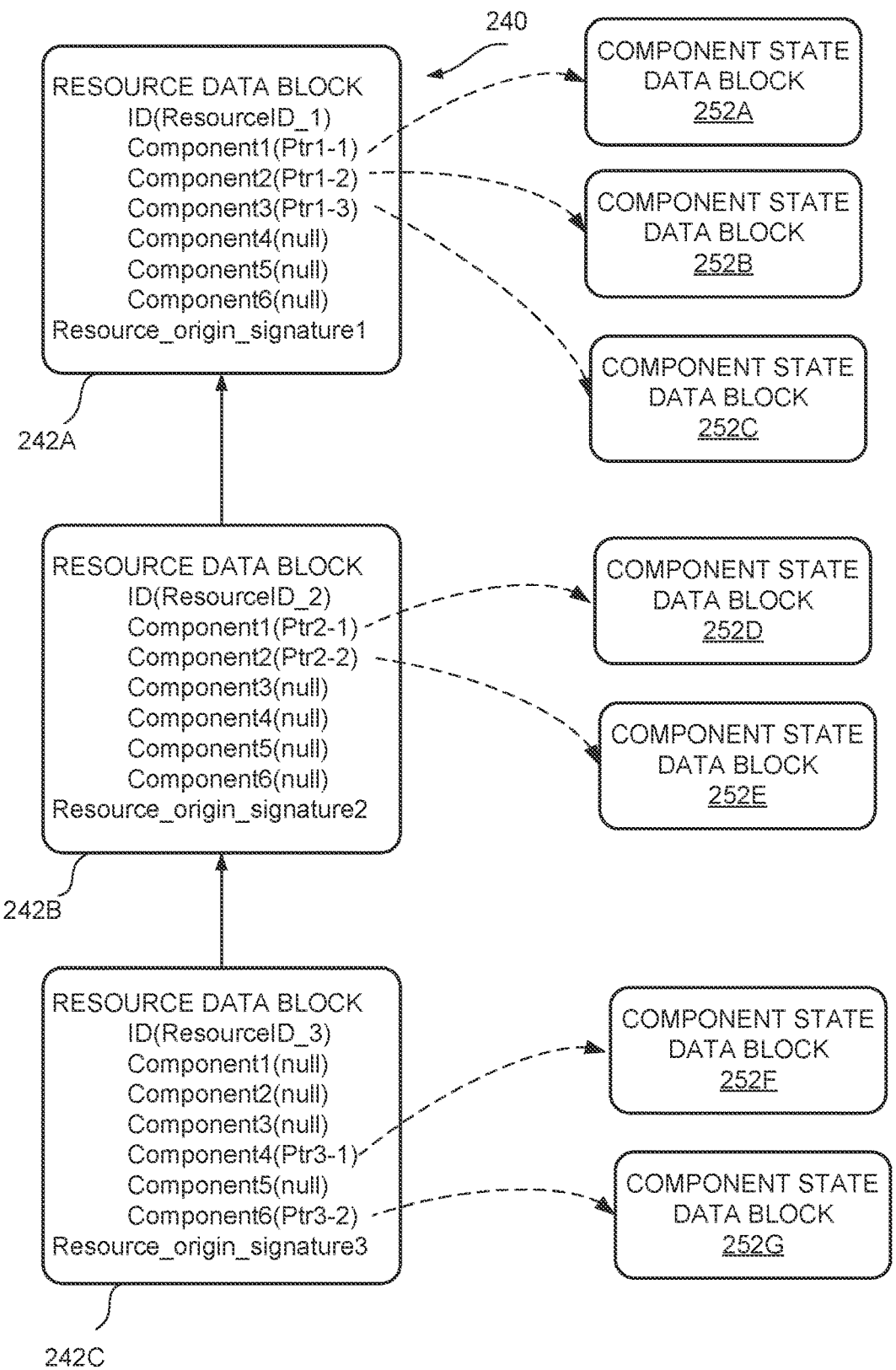
FIG. 2B is a data architecture diagram showing another illustrative example of a resource data blockchain with links populated for component state data blocks provisioned for resources.

FIG. 2B is a data architecture diagram showing another illustrative example of a resource data blockchain 240 with links populated for component state data blocks 252 provisioned for resources. Resource data block 242A for resource ResourceID_1 includes pointer Ptr1-1 for Component1 to component state data block 252A, pointer Ptr1-2 for Component2 to component state data block 252B, and pointer Ptr1-3 for Component3 to component state data block 252C. Component4, Component5 and Component6 are not yet provisioned in ResourceID_1 and so have null pointers.

Similarly, resource data block 242B for resource ResourceID_2 includes pointer Ptr2-1 for Component1 to component state data block 252D and pointer Ptr2-2 for Component2 to component state data block 252E. Component3, Component4, Component5 and Component6 are not yet provisioned in resource ResourceID_2 and so have null pointers. Likewise, resource data block 242C for resource ResourceID_3 includes pointer Ptr3-1 for Component4 to component state data block 252F and pointer Ptr3-2 for Component6 to component state data block 252G. Component1, Compontent2, Component3, and Component5 are not yet provisioned in resource ResourceID_2 and so have null pointers.

Figure 2C:
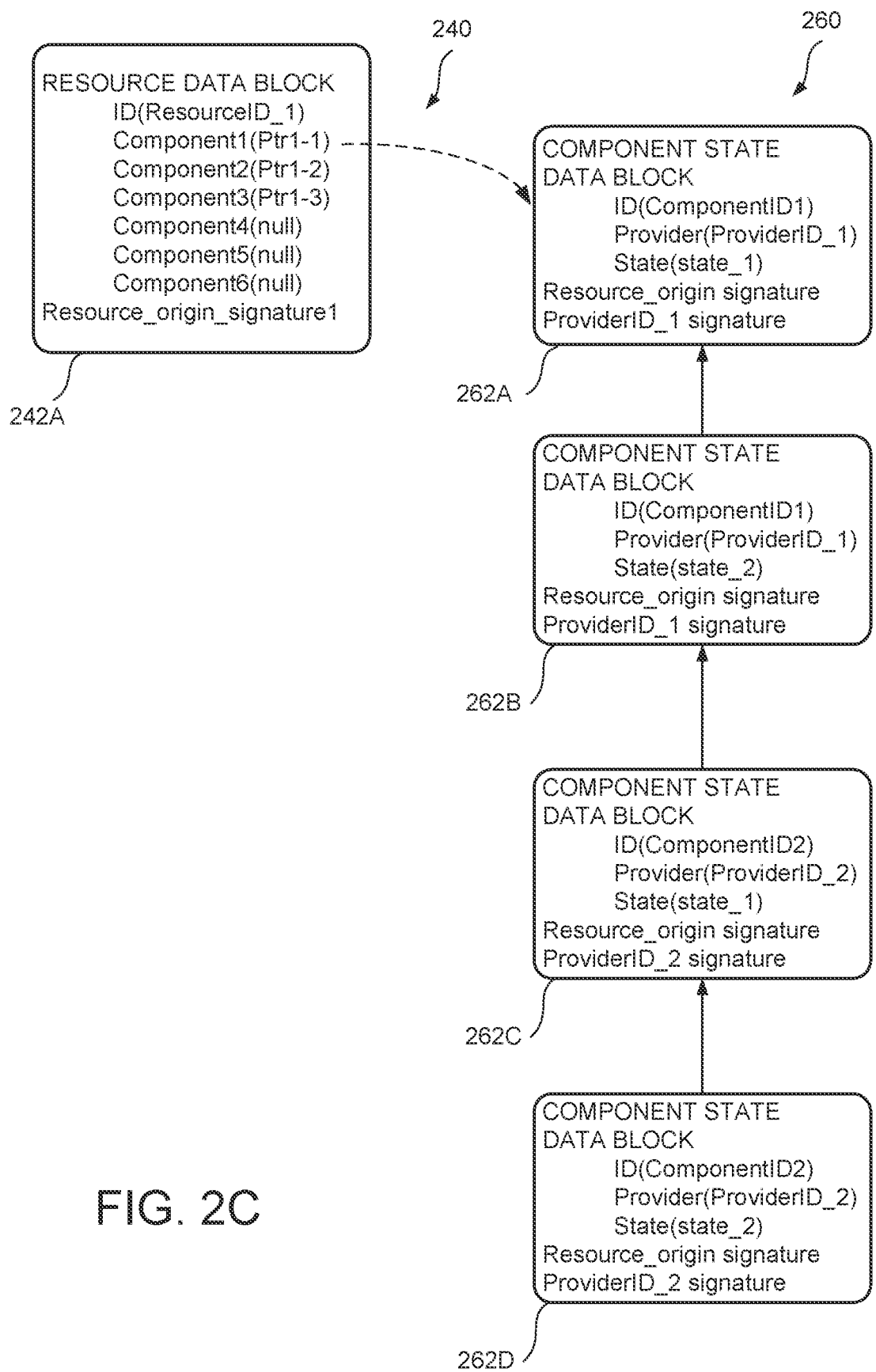
FIG. 2C is a data architecture diagram showing an illustrative example of a resource data blocks referencing component state data blocks secured on a blockchain, where the component state data blocks for a series of modifications of the component are stored on the blockchain.

A component state data blockchain, such as blockchain 150 in FIG. 1 enables component state data to be securely stored to maintain state data for components in a resource as the components are updated over the functional lifetime of the resource. and distributed with use limitation under the control of a resource originator entity. FIG. 2C is a data architecture diagram showing a simplified illustrative example of the use of a component state data blockchain for securely storing a traceable history of component state data for a component of a resource.

Component state data block 262A, in this example, illustrates an initial state of component state data block when initially created by resource originator environment 110. Component state data block 262A includes an identifier for the component state data, e.g. ID(ComponentID1), an identifier for the provider of the component, e.g. Provider (ProvID_1), and the component state data itself, e.g. State (state_1). For example, component state data block 262A can represent an initially provisioned video card, operating system, key or data library. In this example, provisioning of a component requires signatures from both the resource originator ResourceID_1 and the provider ProviderID_1.

Component state data block 262B represents an update to the initial component ComponentID1 represented by block 262A. Because the component is being updated and not replaced, ID remains set to ComponentID1 and Provider remains set to ProviderID_1. State is set to state_2, which represents and documents an update to ComponentID1. For example, an update to firmware on a video card, an update to an operating system, a rotated key, or an updated library. Component state data block 262B is linked to block 262A and signed by the resource originator ResourceID_1 and the provider ProviderID_1.

Component state data block 262C represents a replacement component ComponentID2 that replaces the initial component ComponentID1. Because the component is being replaced and not updated, ID is set to ComponentID2 and Provider is set to ProviderID_2. State is set to state_3, which represents and documents an initial state of ComponentID2. For example, ComponentID2 can be a replacement video card, a new operating system, or a new library. Component state data block 262C is linked to block 262B and signed by the resource originator ResourceID_1 and the provider ProviderID_2.

Component state data block 262D represents an update to the replacement component ComponentID2 represented by block 262C. Because the component is being updated and not replaced, ID remains set to ComponentID2 and Provider remains set to ProviderID_2. State is set to state_4, which represents and documents an update to ComponentID2. Component state data block 262B is linked to block 262D and signed by the resource originator ResourceID_1 and the provider ProviderID_2.

Figure 3A:
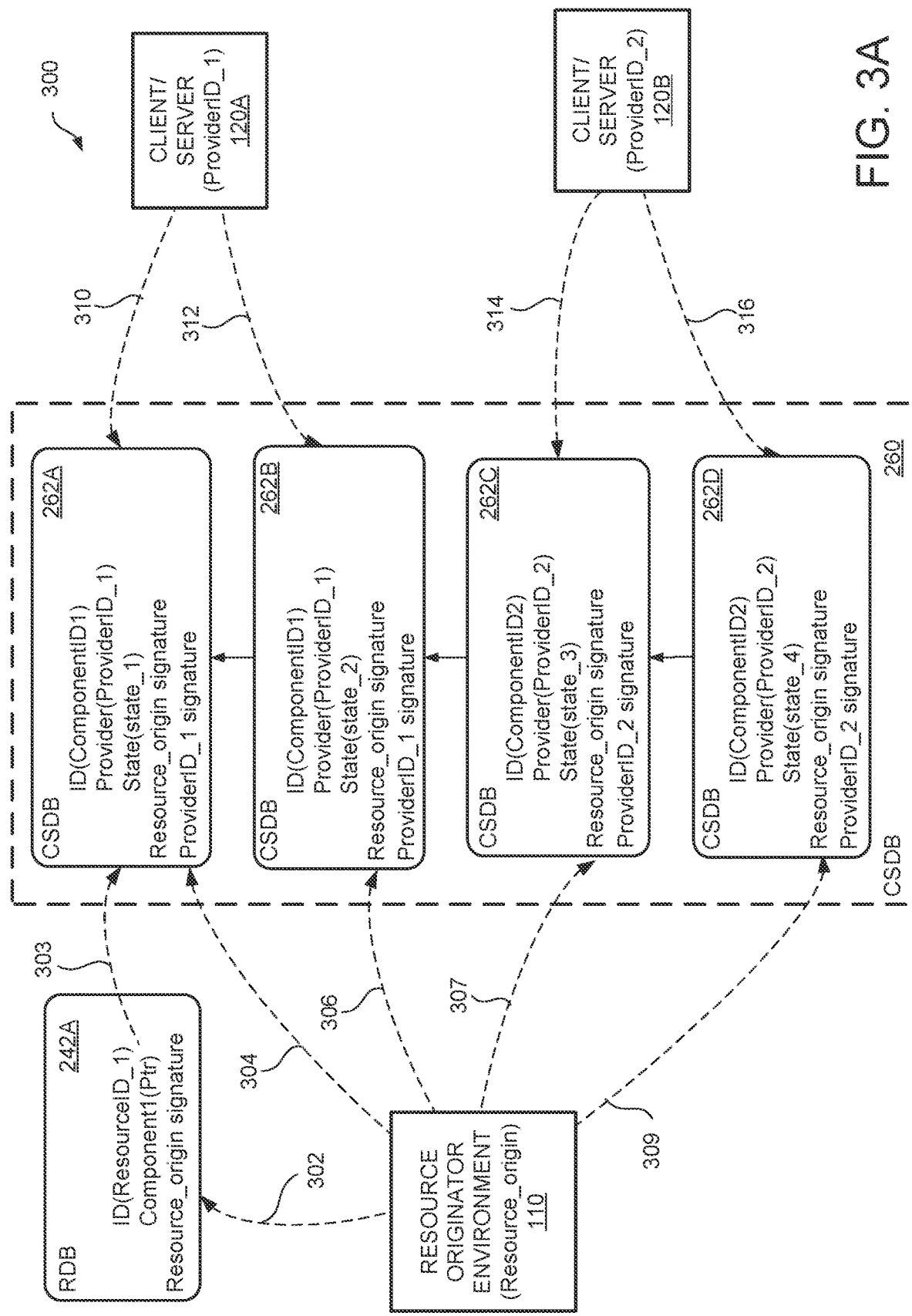
FIG. 3A is a data architecture diagram showing an illustrative example of a resource originator environment for a resource creating a resource data block that includes a pointer to a component state data blockchain for the component that illustrates an example of a series of modifications of the component that are recorded on the component state blockchain.

FIG. 3A is a data architecture diagram illustrating an example of data flowing from resource provider and component provider entities in the example of FIG. 2C. At 302, resource originator environment 110 creates resource data block 242A for resource Resource ID_1 and signs block 242A. When ProviderID_1 provisions Component1 of ResourceID_1 with component ComponentID1, ProviderID_1, utilizing client/server 120A, creates, at 310, component state data block 262A with ID=ComponentID1, Provider=ProviderID1, and State=state_1. Component1 (Ptr) in resource data block 242A is set, at 303, to point to block 262A and, at 304, resource originator environment 110 signs block 262A, which is committed to component state data blockchain 260.

When ProviderID_1 updates Component1 using client/server 120A, ProviderID_1 creates and signs, at 312, component state data block 262B with ID=ComponentID1, Provider=ProviderID_1, and State=state_2, which is signed by the resource origination entity using environment 110, at 306. Component state data block 262B is linked to component state data block 262A in component state data blockchain 260.

When ProviderID_2 replaces Component1 using client/server 120B, ProviderID_2 creates and signs, at 314, component state data block 262C with ID=ComponentID2, Provider=ProviderID_2, and State=state_3, which is signed by the resource origination entity using environment 110, at 307. Component state data block 262C is linked to component state data block 262B in component state data blockchain 260.

When ProviderID_2 updates ComponentID2, ProviderID_2, using client/server 120A, creates and signs, at 312, component state data block 262B with ID=ComponentID2, Provider=ProviderID_2, and State=state_4, which is signed by the resource origination entity using environment 110, at 309. Component state data block 262D is linked to component state data block 262C in component state data blockchain 260.

As illustrated in the example of component state data blockchain 260, the disclosed technology can be used to produce a component state data blockchain that can provide traceable, immutable state data pertaining to Component1 of ResourceID_1. The component state data permits an audit to be performed on Component1 that can identify changes made to the component and who made the change to the component. If a date stamp is included in the component state data block, then the date of a component change can be established. Other data can be included in the component state data blocks that can be useful to in auditing or troubleshooting. In implementations that require the resource originator to sign the component state data blocks 262, the resource originator can maintain control over the component state data.

Figure 3B:
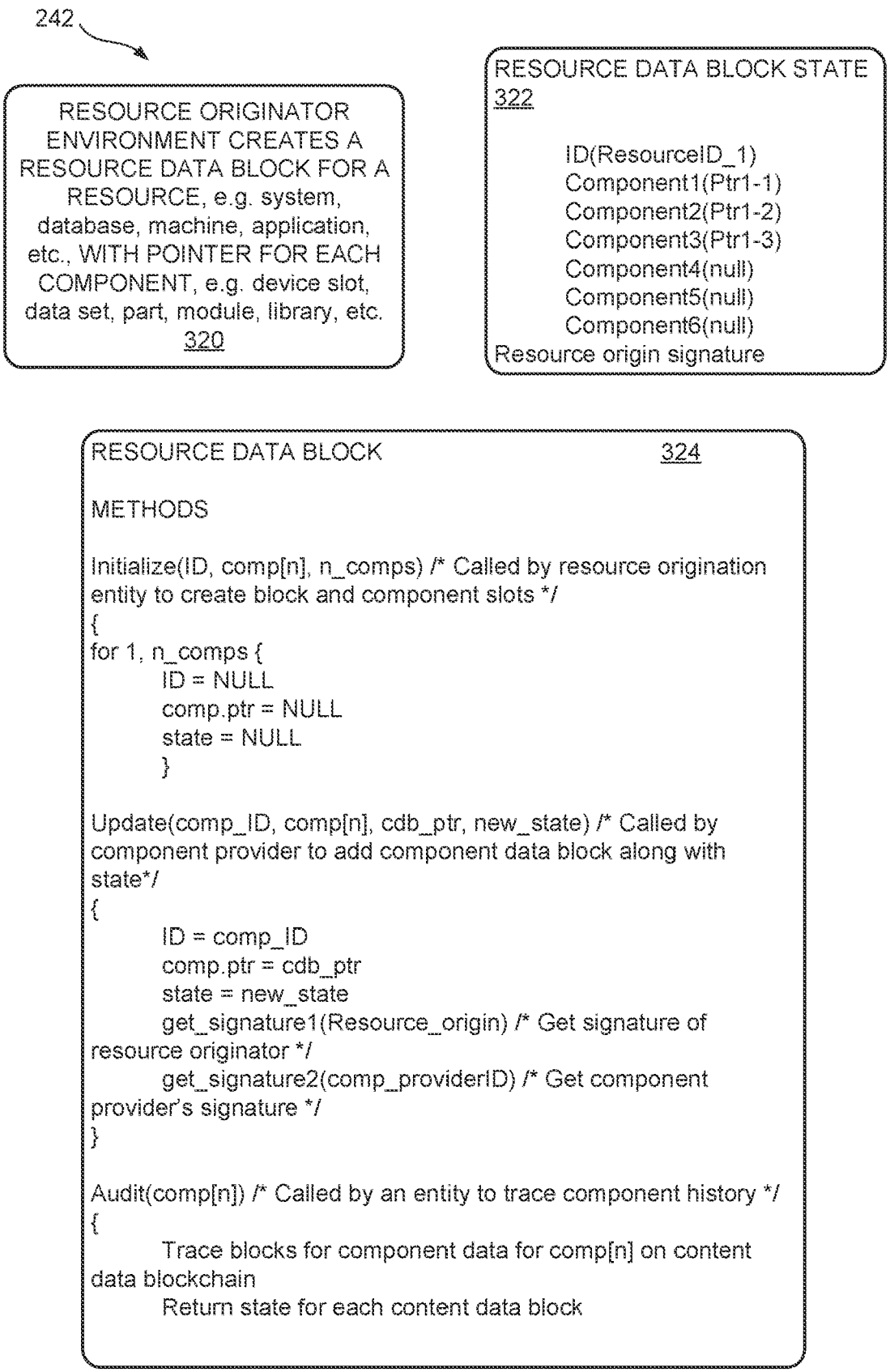
FIG. 3B is a data architecture diagram showing an illustrative example of a resource data block that includes code for methods for initializing components for the resource, updating the component to a new state, and auditing the history of component state data for the component.

FIG. 3B is a data architecture diagram showing an illustrative example of a resource data block 342 that includes code for methods for initializing components for the resource, updating the component to a new state, and tracing the history of component state data for the component. The disclosed technology enables resource data and component state data to be securely stored and distributed on a blockchain. The blockchain can be made widely accessible to users of the component state data. The blockchain platform supporting the blockchain storing the resource data or component state data ensures the integrity of the data and methods.

Scripts for initializing, updating and auditing component state data can be secured by a resource data block 342 stored on a blockchain, such as resource data blockchain 140 of FIG. 1, and executed by the operating system of the decentralized, distributed blockchain platform. FIG. 3B illustrates an example of a resource data block 342 with code 354 that provides Initialize, Update and Audit scripts. Also shown is a process 350 in a blockchain environment that creates a resource data block 342. An example of block state 352 defined for the resource data block 342 is also shown.

In this example, the Initialize script is called by a resource originator entity to initialize a resource data block with an array, where each element of the array corresponds to a component of the resource. At initialization, in this example, each element of the array has a null component identifier, e.g. ID=NULL, a null pointer, e.g. comp.ptr=NULL, and a null state, e.g. state=NULL.

The example of FIG. 3B also shows an Update script, which is called by a component provider to add component state data to a component of the resource data block 342. In the example shown, the Update script is called to create a new component state data block with an identifier for the component provider, a pointer to the component state data block, and new state for the component. The Update script also obtains signatures from the resource originator entity and the component provider entity for the component state data block.

An Audit script can be utilized by an entity to trace a component's state history by tracing the component state data blocks in a blockchain and returning the state information from each block. For example, the Audit script may return the component identifier, component provider, component state and date from each component state data block in the blockchain for the component.

In an alternative implementation, the resource originator entity creates a resource data block with a pointer or link for each tracked component anticipated for the resource. The resource originator entity also creates an initial component state data block for each tracked component to which the pointer in the resource data block is directed.

When a component is provisioned in the resource, a new component state data block is created with the component state data and linked to the initial component state data block for the component. Each subsequent update or replacement action for the component involves the creation of another component state data block that is linked to the previous component state data block in the blockchain.

Also note that some functionality, such as the Update method described above with regard to resource data block methods 354 can be alternatively implemented in the component state data blocks. Additional functionality, such as functionality for controlling access to the resource and component state data or encryption or decryption of the data, can be included in the resource data block methods or component state data blocks. It will be appreciated that the disclosed technology can support many different implementations.

Figure 4A:
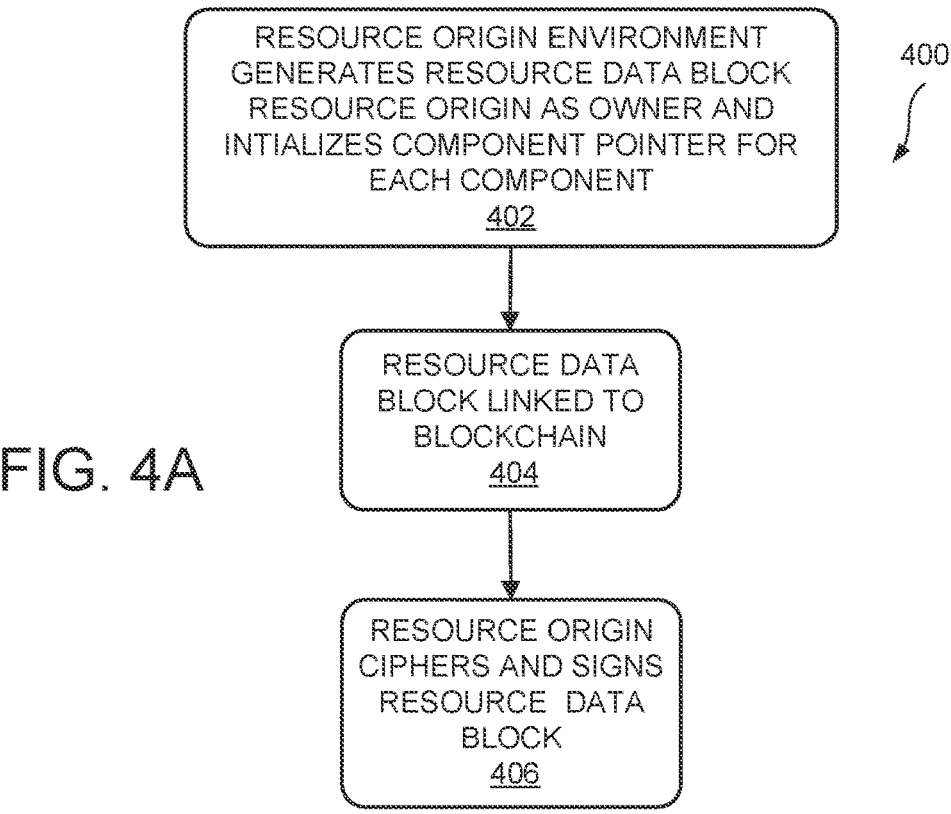
FIG. 4A is a control flow diagram showing an illustrative example of a process for a resource originator entity to create a resource data block on a resource data blockchain for a resource.

FIG. 4A is a control flow diagram showing an illustrative example of a process 400 for creating a resource data block for securely storing resource data on a blockchain in accordance with the disclosed technology. This example involves creating a resource data block, at 402, that is owned by a resource originator for a resource and is initialized with a resource identifier and a component pointer for each component in the resource. At 404, the resource data block created at 402 is linked to a blockchain and, at 406, the block is ciphered and signed by the resource originator entity to commit the block to the data blockchain, such as resource data blockchain 140 in FIG. 1.

Figure 4B:
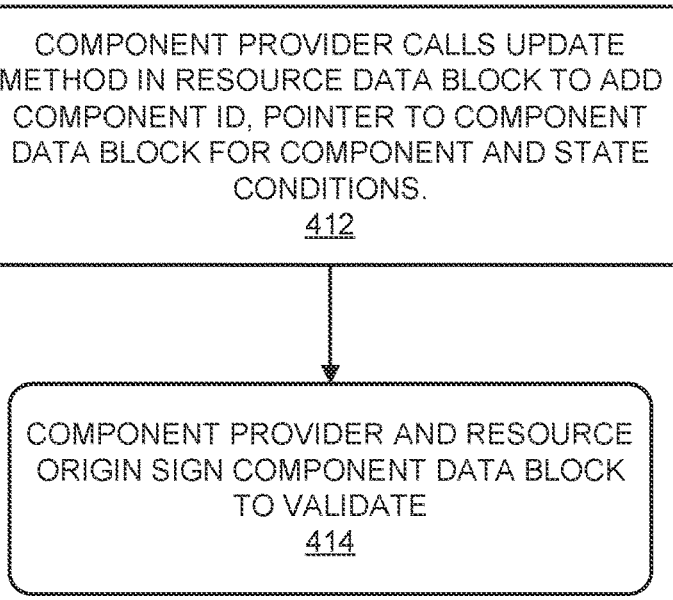
FIG. 4B is a control flow diagram showing an illustrative example of a process for a component provider to create a component state data block on a component state data blockchain to record a state update for the component, where the resource originator maintains control over the state update.

FIG. 4B is a control flow diagram showing an illustrative example of a process 410 for a component provider to call an Update method in the resource data block to add a component state data block with a component identifier and state for the component and set a pointer for the component in the resource data block to point to the component state data block. At 414, the component provider and the resource originator sign the component state data block to validate the block and commit the block to a blockchain, such as the component state data blockchain 150 of FIG. 1, blockchain 250 of FIG. 2C or FIG. 3A.

Figure 4C:
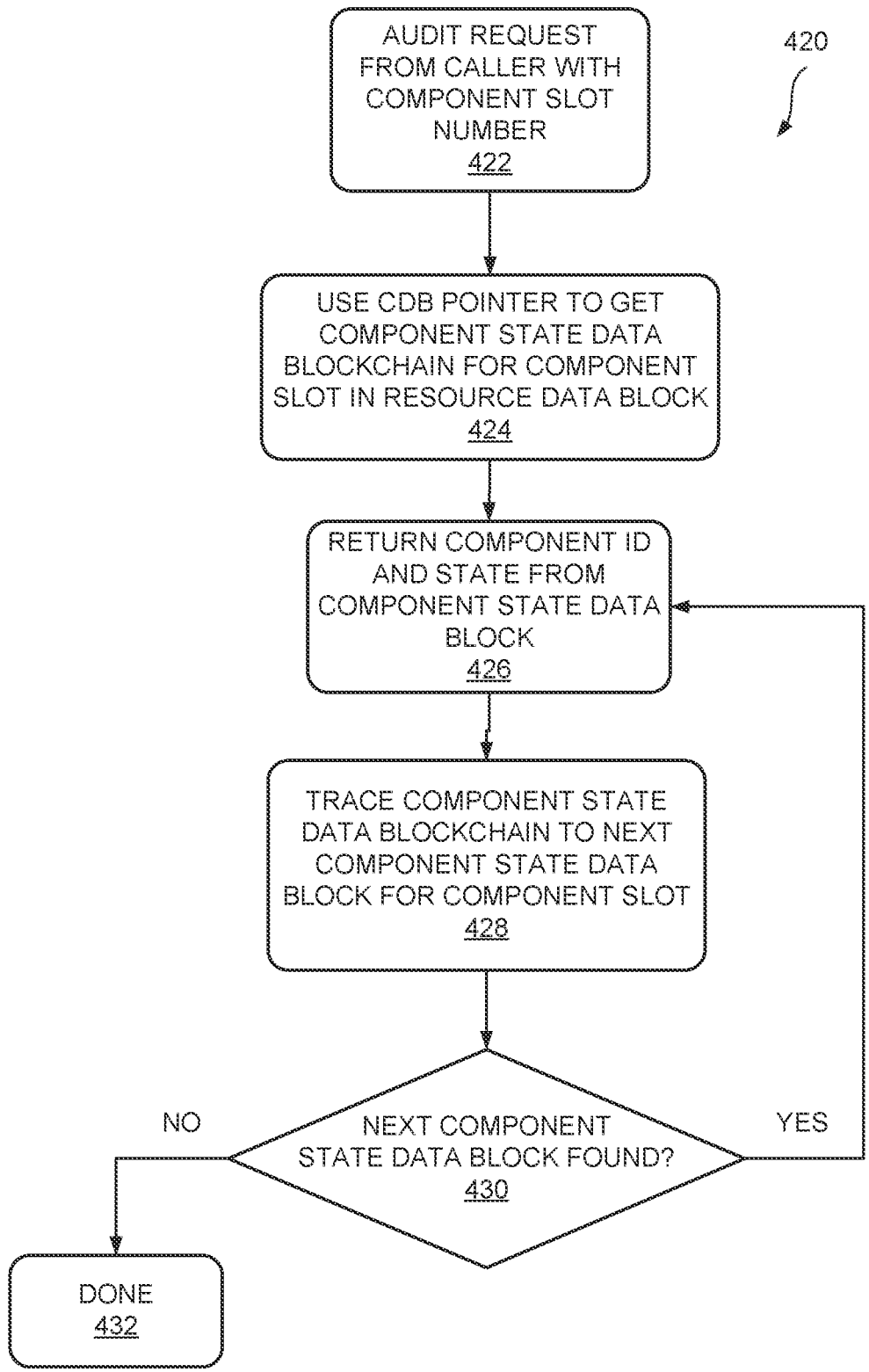
FIG. 4C is a control flow diagram illustrating an example of a process for auditing a history of component state updates for a component by tracing the component state data blockchain for the component.

FIG. 4C is a control flow diagram showing an illustrative example of an Audit process 420 for tracing the component data blocks for a component identified in a resource data block. At 422, an Audit request is received from a caller, such as an entity invoking the Audit method in resource data block method 354 illustrated in FIG. 3B, with, in this example, a component slot number for the resource to which the resource data block pertains. In other examples, the resource data block may store the component identifier values for the provisioned components of a resource and the corresponding Audit method can be invoked with a component identifier value for a component for which the audit is requested. A variety of approaches can be utilized that are consistent with the disclosed technology.

At 424, the component data block pointer from the component slot in the resource data block is utilized to access the component state data blockchain for the component. At 426, the component identifier and state data are obtained from a first component state data block in the component state data blockchain, such as the blockchain 150 shown in FIG. 1 or the blockchain 260 shown in FIGS. 2C and 3A.

At 428, the link in the first component state data block to the next component state data blockchain is utilized to trace to the next component state data block. If the next component state data block exists in the blockchain, then, at 430, control returns to 426 to return the component identifier and component state data from the next component state data block. The cycle is completed to obtain the component state data for each block in the component state data blockchain for the component. When no more blocks remain in the component state data blockchain, then control branches to 432 to complete the Audit process 420.

Figure 4D:
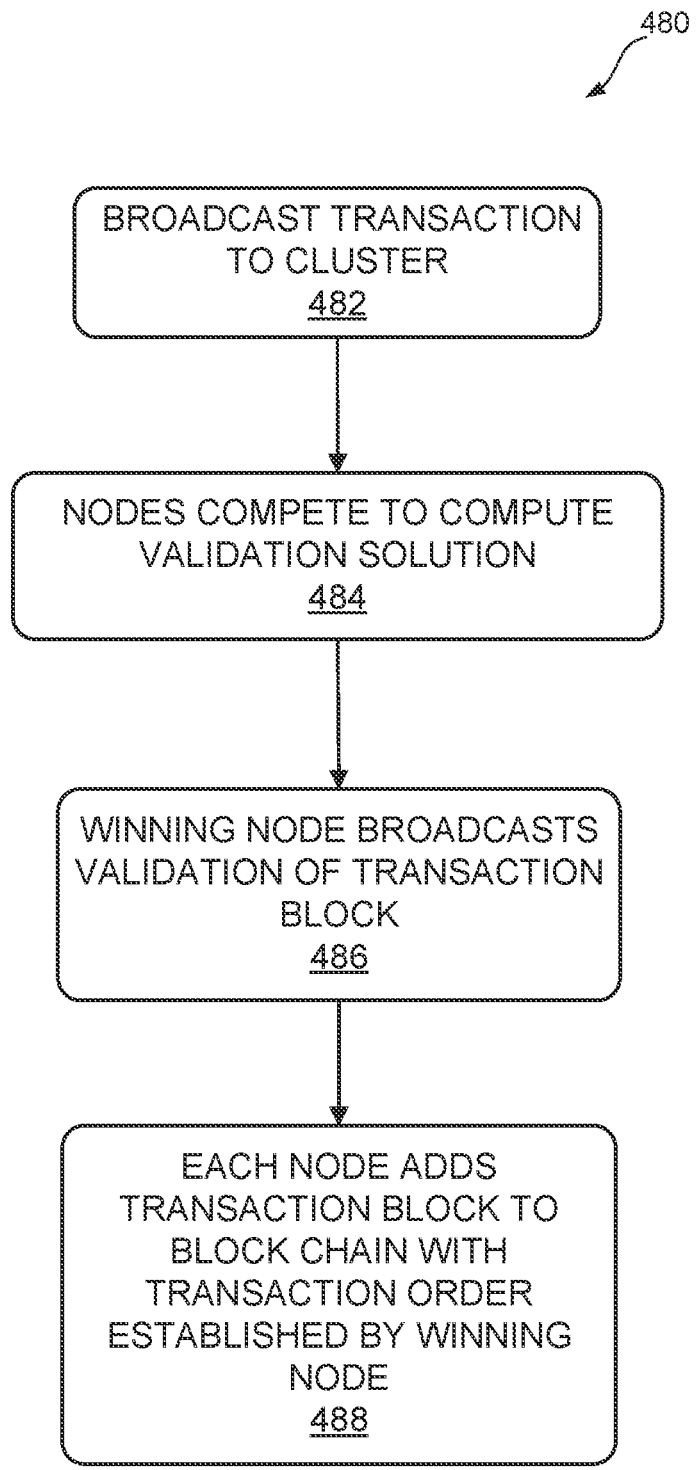
FIG. 4D is a control flow diagram illustrating an example of a validation process for blocks added to the resource data blockchain or component state data blockchain distributed to untrusted nodes.

FIG. 4D is a control flow diagram illustrating an example of a validation process 480 for blocks added to the resource data blockchain ledger or component state data blockchain ledger implemented using untrusted blockchain nodes. In process 480, when a resource data block 142 is created for resource data blockchain 140 or a component state data block 152 is created for component state data blockchain 150 in FIG. 1, the transaction is broadcast, at 482, to the cluster of untrusted nodes. At 484, nodes compete to compute a validation solution for the transaction. At 486, a winning node broadcasts the validation solution for the resource data block or component state data block and adds the data block to its copy of the corresponding data blockchain ledger, e.g. resource data blockchain 140 or component state data blockchain 150 in FIG. 1.

At 488, in response to the winning node's broadcast, the other nodes add the resource data block or component state data block to their copies of the resource data blockchain ledger or component state data blockchain ledger in the transaction order established by the winning node. The decentralized validation protocol can maintain the integrity, immutability and security of the resource data blockchain ledger or component state data blockchain ledger.

It should be appreciated that the processes shown for examples and a variety of other approaches may be utilized without departing from the disclosed technology.

Depending upon the scripting capabilities of the blockchain platform, the data blocks of the resource data blockchain or component state data blockchain may include more extensive code execution. For example, a resource component state data system that provides for shared access to the component state data by multiple users may require more extensive code execution capability in the blockchain than a component state system that limits access to a single user. Similarly, a component state system based on a component state data blockchain that decrypts the component state data or utilizes information from third parties for verification may require more extensive code execution capability in the blockchain.

It should be appreciated that the utilization of blockchain technology, such as scripting technology within smart contracts, in this context provides a high degree of flexibility and variation in the configuration of implementations without departing from the teachings of the present disclosure.

Note that the disclosed technology may be applied to maintaining resource state data for a variety of types of resources and components. The technology may be applied to secure storage and distribution of resource and component state data.

Figure 5:
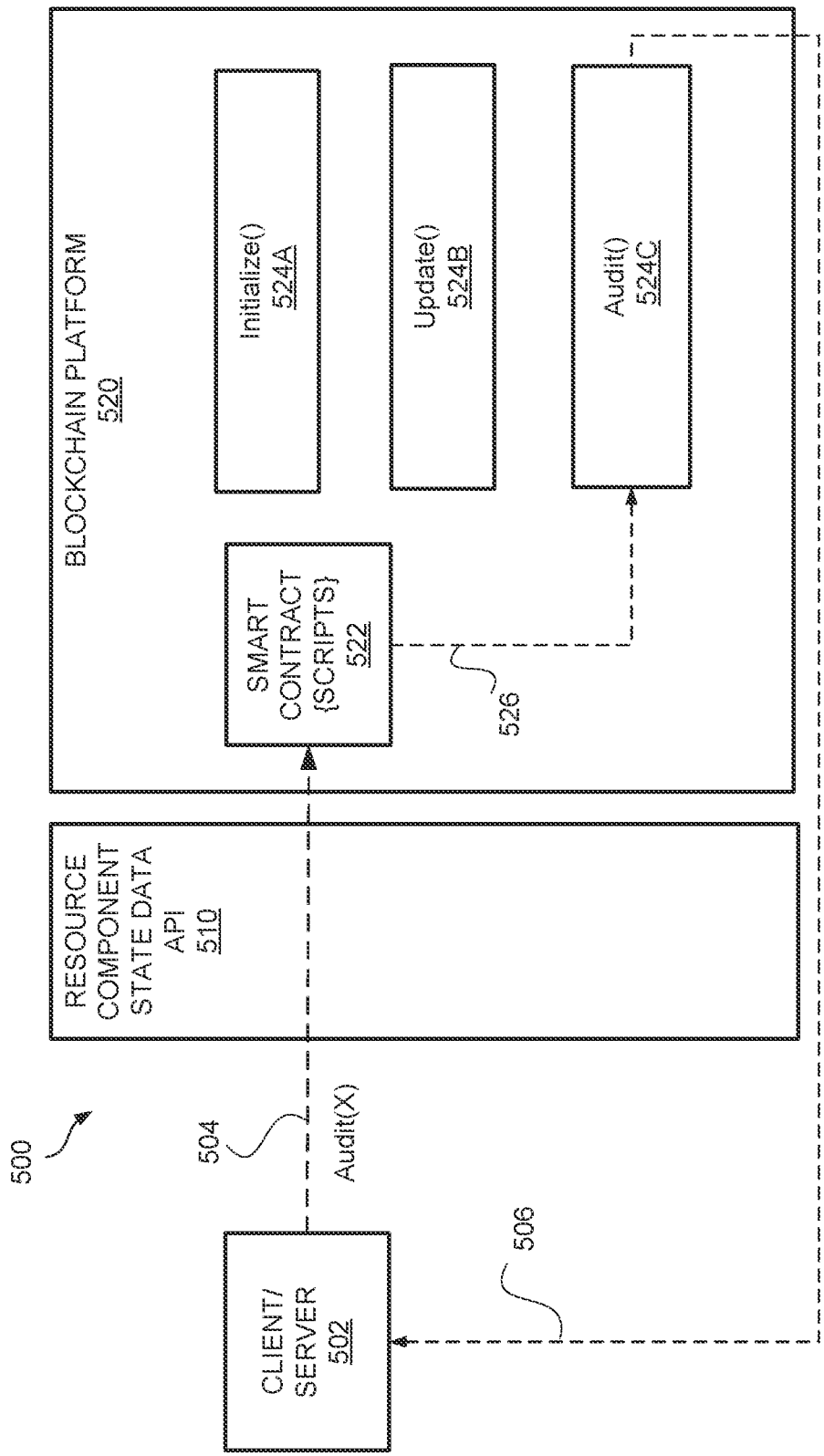
FIG. 5 is a data architecture diagram showing an illustrative example of a user using an application programming interface to access component state data on a component state data blockchain.

FIG. 5 is a data architecture diagram showing an illustrative example of an interface for managing and accessing resource data and component state data for the resource as maintained in a resource data blockchain, such as blockchains 140 and 150 in FIG. 1, blockchain 200 in FIG. 2A, blockchain 240 in FIG. 2B, or blockchain 260 in FIG. 3A. In this example, an Application Program Interface (API) 510 provides an interface to the blockchain platform 520 that supports the resource data blockchain or component state data blockchain. The blockchain platform 520 supports a smart contract 522, such as resource data block 342 in FIG. 3B, which includes scripts 524 with code that, when executed by the blockchain platform 520, performs operations with respect to the resource data and component state data blockchains.

In the example of FIG. 5, three scripts are defined in smart contract 522. The Initialize script 524A permits a resource originator entity to initialize a resource data block for a resource to maintain component state data for components provisioned in the resource. The Update script 524B provides for a component provider entity to create a component state data block on the blockchain that includes component state data for a component provisioned in the resource. The Audit script is used to trace the component state data blocks stored in a component state data blockchain pertaining to a component in a resource to obtain the history of the component in the resource.

In the example of FIG. 5, a user of client/server 502, sends an Audit request 504 through a resource component state data API 510 to smart contract 522 to invoke, at 526, the Audit script 524C. The Audit script traces the component state data blockchain for the component to obtain the historical component state data for the component, which is returned, at 506, to client/server 502.

Blockchain Ledger Data Structure

Figure 6A:
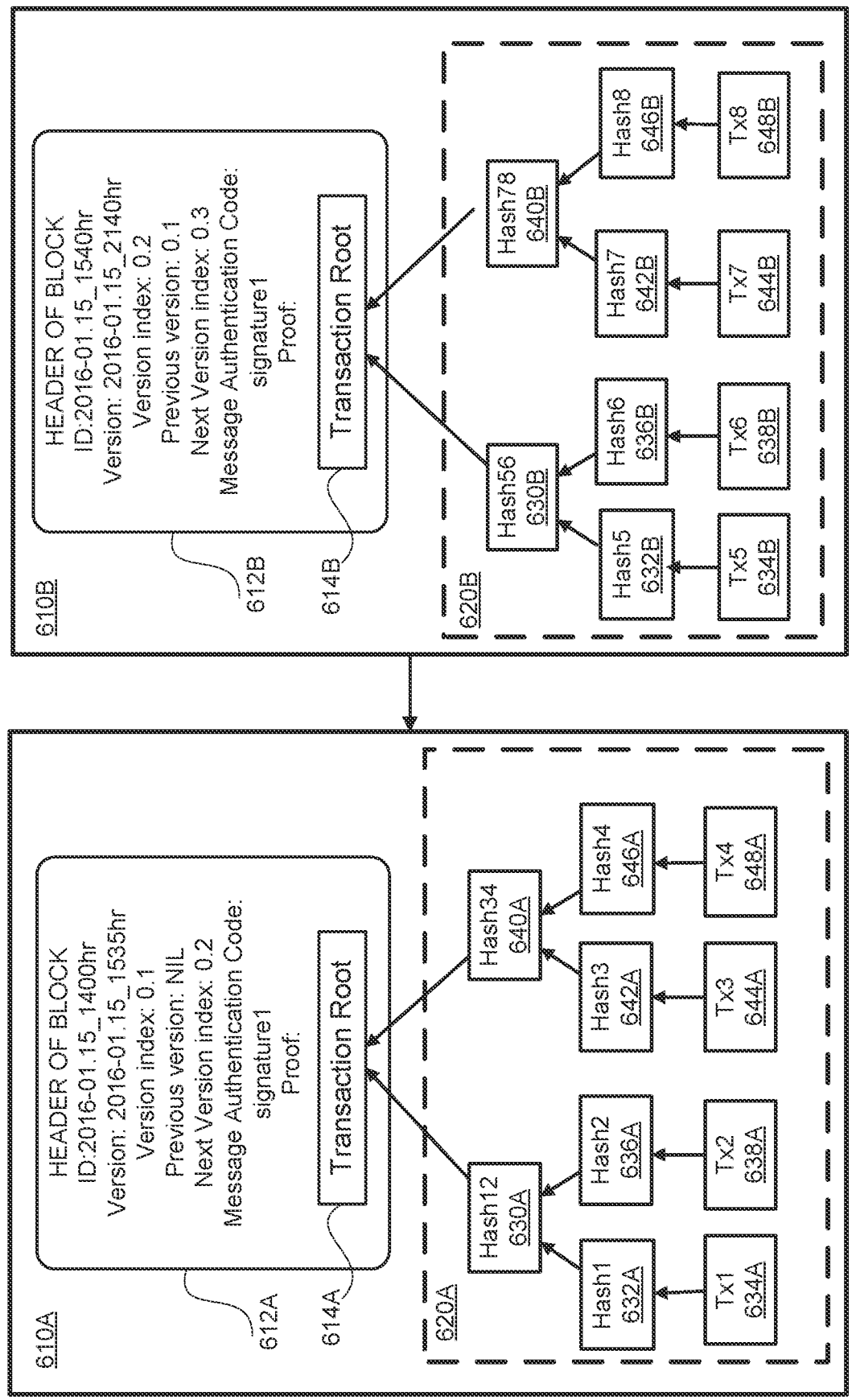
FIG. 6A is a data architecture diagram illustrating a simplified example of a blockchain ledger based on the resource data blocks of the resource data blockchain or component state data blocks of the component state data blockchain of FIG. 1.

FIG. 6A is a data architecture diagram illustrating a simplified example of a blockchain ledger 600 based on the blocks 142A-E of the resource data blockchain 140 or blocks 152A-E of the component state data blockchain 150 of FIG. 1. The blockchain ledger 600 example of FIG. 6A is simplified to show block headers, metadata and signatures of blocks 142A-E or blocks 152A-E in order to demonstrate a secure resource component state data ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
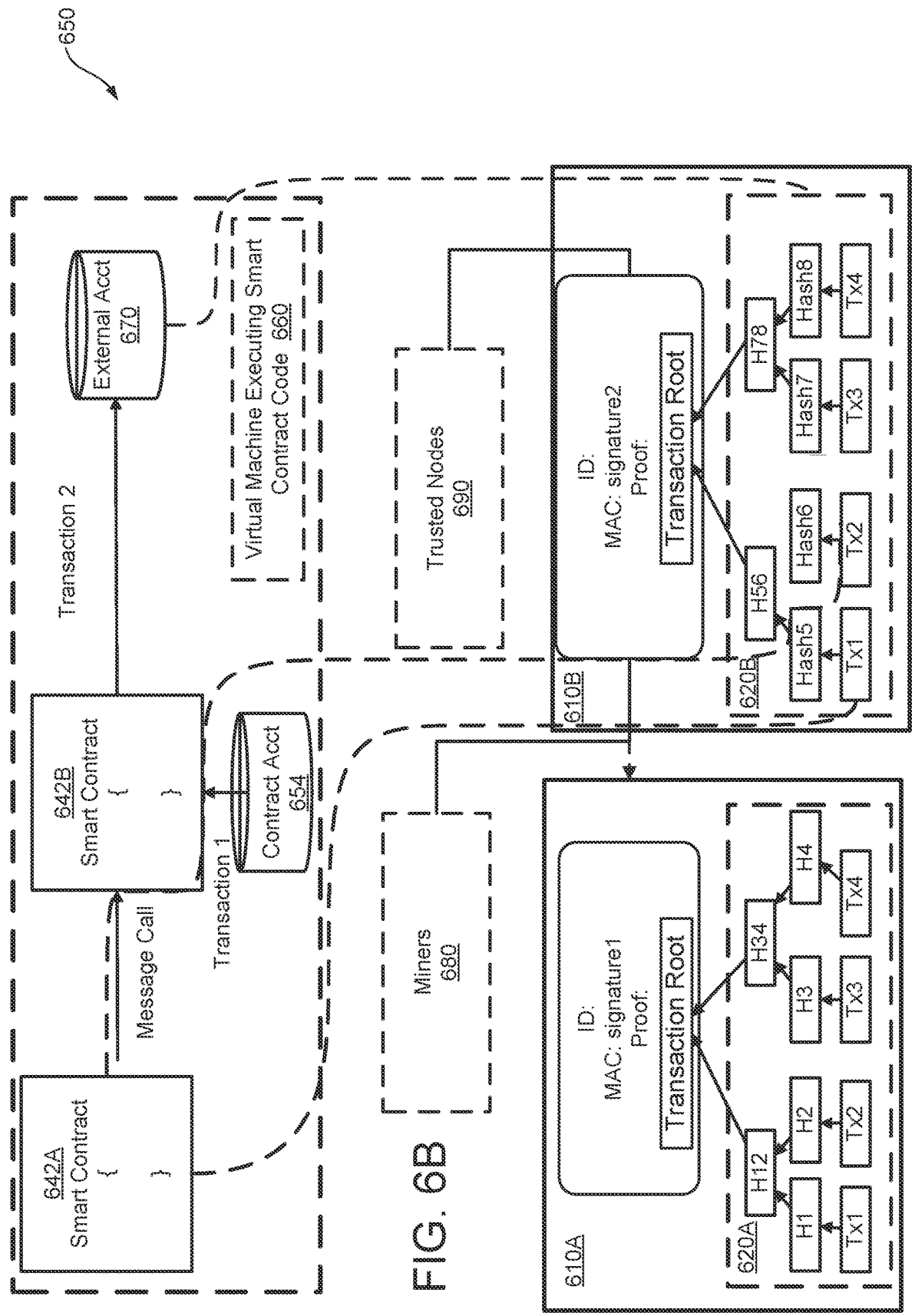
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as resource originator environment 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a resource data block 142 for resource data blockchain 140 or a component state data block 152 for component state data blockchain 150, the block is an unconfirmed and unidentified entity. To be part of the acknowledged "currency", it may be added to the blockchain, and therefore relates to the concept of a trusted cluster.

In a trusted cluster, when a data block 142 or 152 is added, every node competes to acknowledge the next "transaction" (e.g. a new resource data or component state data block). In one example, the nodes compete to mine and get the lowest hash value: min {previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

The mining process, such as may be used in concert with the validation process 480 of FIG. 4D, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software. Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the component state data blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource and component state data on a blockchain can be restricted by cryptographic means to be only open to authorized servers. Since the resource data or component state data blockchain ledgers are distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a component state data blockchain ledger. The specific examples of different aspects of a component state data blockchain ledger described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously.

Similarly, transaction data executed and generated by smart contracts may be stored in the blockchain ledger in the ways previously described.

Computer Architectures for Use of Smart Contracts and Blockchain Ledgers

Figure 8:
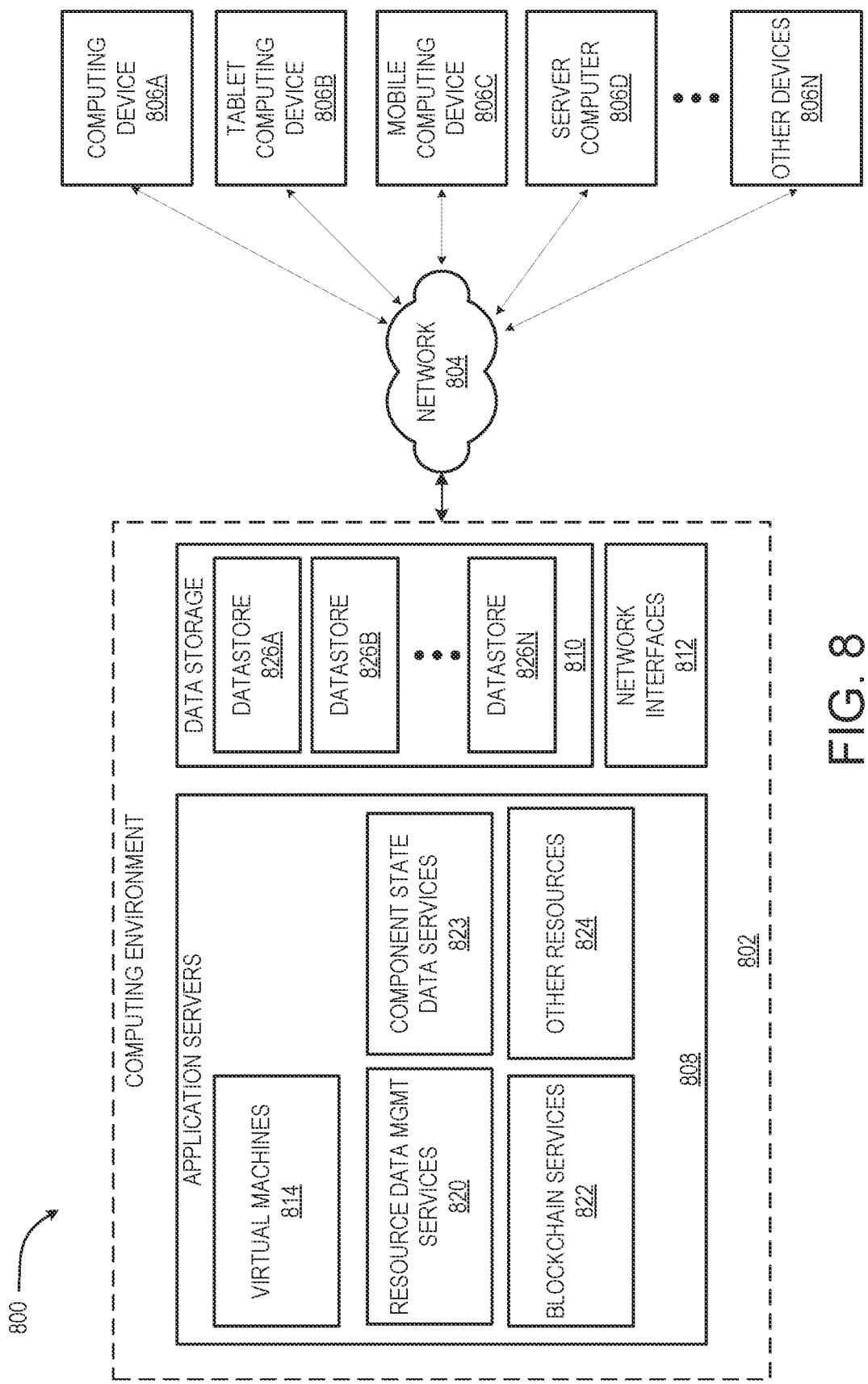
FIG. 8 is a diagram illustrating a distributed computing environment capable of implementing aspects of the techniques and technologies presented herein.

Note that at least parts of processes 400, 410, 420, and 480 of FIGS. 4A-D, the scripts of resource data block 242 of FIG. 3B, smart contract 522 of FIG. 5, smart contracts 642 of FIG. 6B, and other processes and operations pertaining to resource data and component state data blockchain ledgers described herein may be implemented in one or more servers, such as computer environment 800 in FIG. 8, or the cloud, and data defining the results of user control input signals translated or interpreted as discussed herein may be communicated to a user device for display. Alternatively, the component state data blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 420, and 480 of FIGS. 4A-D, the scripts of resource data block 242 of FIG. 3B, smart contract 522 of FIG. 5, smart contracts 642 of FIG. 6B) are described herein as being implemented, at least in part, by an application, component, and/or circuit. Although the following illustration refers to the components of FIGS. 1, 3B, 4A-D, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 420, and 480 of FIGS. 4A-D, the scripts of resource data block 242 of FIG. 3B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
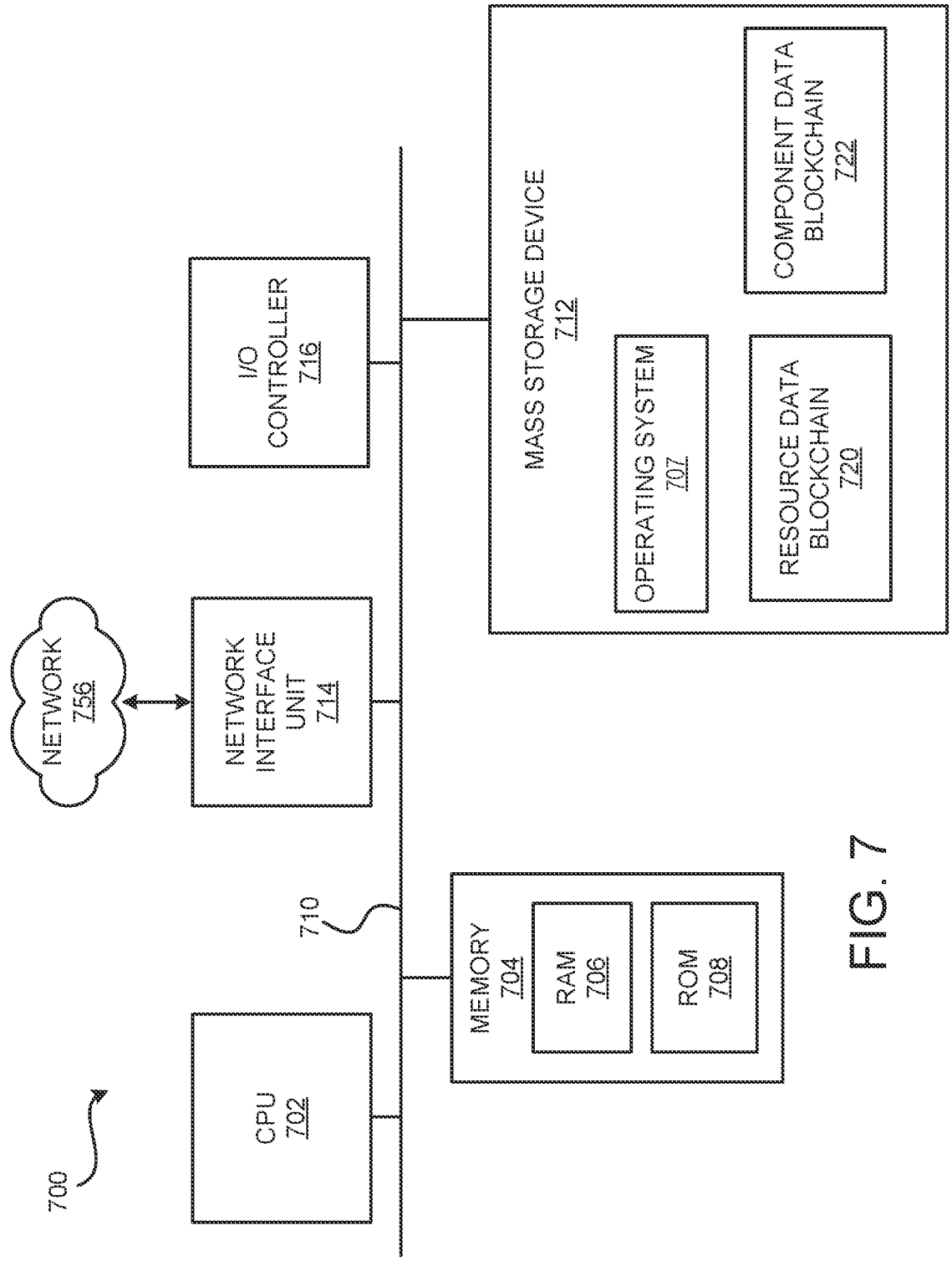
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of resource data blockchain data 720 or component state data blockchain data 722), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a component state data blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more resource data management services 820 and one or more blockchain services 822. The resource data management services 820 can include services for managing resource data on a resource data blockchain, such as resource data blockchain 140 in FIG. 1. The component state data management services 823 can include services for managing component state data for a resource on a component state data blockchain, such as component state data blockchain 150 in FIG. 1. The blockchain services 822 can include services for participating in management of one or more blockchains, such as by creating genesis blocks, resource data or component state data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a component state data blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a component state data blockchain ledger, among other aspects.

Figure 9:
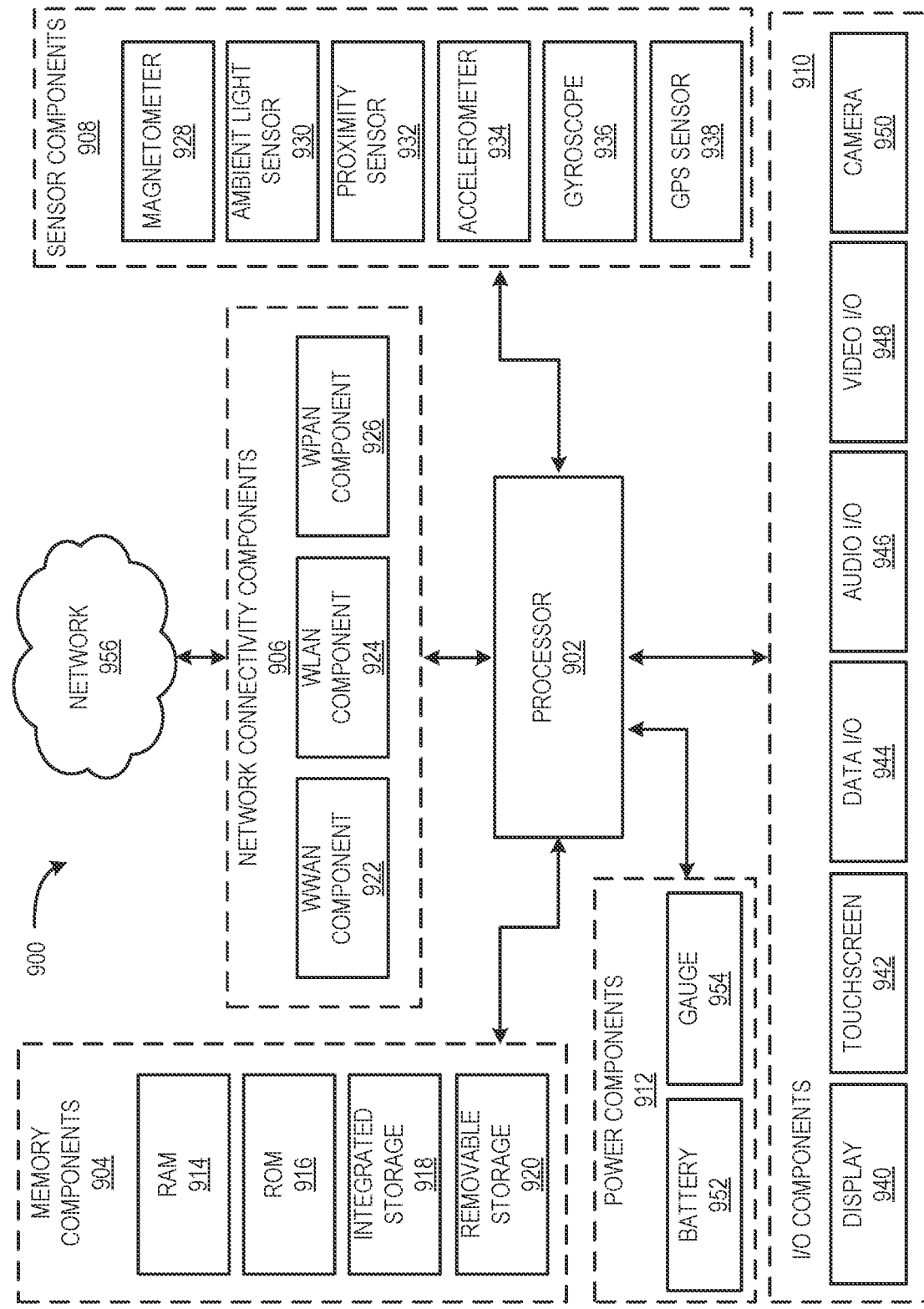
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for a component state data blockchain ledger. The computing device architecture 900 is applicable to computing devices that can manage a component state data blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the resource originator environment 110, client/servers 120A-C and blockchain platform 130 shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS MOBILE OS from Microsoft Corporation of Redmond, Wash., WINDOWS PHONE OS from Microsoft Corporation, WINDOWS from Microsoft Corporation, MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1: A computer-implemented method for storing component state data for components of a resource, the method comprising: generating a resource data block that corresponds to a resource, where the resource data includes one or more links and each link corresponds to one of one or more components of the resource; generating a first component state data block for a first component of the resource on a blockchain, the first component state data block for the first component including first state data corresponding to the first component; and setting the link that corresponds to the first component to reference the first component state data block.

Clause 2. The computer-implemented method of Clause 1, where: the step of generating a resource data block that corresponds to a resource comprises generating a resource data block that corresponds to a resource by a resource originator entity; and the step of generating a first component state data block for a first component of the resource on a blockchain includes requiring the first component state data block to be signed by the resource originator entity.

Clause 3. The computer-implemented method of Clause 1, the method including: generating a second component state block for the first component, the second component state block for the first component including second state data corresponding to the first component; and linking the second component state data block to the first component state data block.

Clause 4. The computer-implemented method of Clause 3, where: the step of generating a resource data block that corresponds to a resource comprises generating a resource data block that corresponds to a resource by a resource originator entity; the step of generating a second component state data block for the first component comprises generating the second component state block for the first component by a component provider entity; and the method includes requiring the second component state data block to be signed by the resource originator entity and the component provider entity.

Clause 5. The computer-implemented method of Clause 1, the method including: generating a second component state data block for a second component on the blockchain, the second component state data block for the second component including first state data for the second component; and setting the link in the resource data block that corresponds to the second component to reference the first component state data block for the second component on the blockchain.

Clause 6. The computer-implemented method of Clause 1, where: the step of generating a resource data block that corresponds to a resource, where the resource data includes one or more links and each link corresponds to one of one or more components of the resource includes: generating a null component state data block for each of the one or more components of the resource, and for each one of the one or more components, setting the link that corresponds to the component to reference the null component state data block for the component; and the step of setting the link that corresponds to the first component to reference the first component state data block comprises linking the first component state data block to the null component state data block for the first component.

Clause 7. The computer-implemented method of Clause 1, where at least one of: the resource comprises a system and the first component comprises a sub-component of the system; the resource comprises a service and the first component comprises a component of the service; the resource comprises a database and first component comprises a subset of data; the resource comprises an operating system and the first component comprises one of a library, a management subsystem and a device driver; and the resource comprises an application and the first component comprises an update to the application.

Clause 8. A system for storing component state data on a blockchain, the system comprising: one or more processors; and one or more memory devices in communication with the one or more processors, the memory devices having computer-readable instructions stored thereupon that, when executed by the processors, cause the processors to perform a method for storing component state data for components of a resource, the method comprising: generating a resource data block that corresponds to a resource, where the resource data includes one or more links and each link corresponds to one of one or more components of the resource; generating a first component state data block for a first component of the resource on a blockchain, the first component state data block for the first component including first state data corresponding to the first component; and setting the link that corresponds to the first component to reference the first component state data block.

Clause 9. The system of Clause 8, where: the step of generating a resource data block that corresponds to a resource comprises generating a resource data block that corresponds to a resource by a first entity; and the step of generating a first component state data block for a first component of the resource on a blockchain includes requiring the first component state data block to be signed by the first entity.

Clause 10. The system of Clause 8, the method including: generating a second component state block for the first component, the second component state block for the first component including second state data corresponding to the first component; and linking the second component state data block to the first component state data block.

Clause 11. The system of Clause 10, where: the step of generating a resource data block that corresponds to a resource comprises generating a resource data block that corresponds to a resource by a first entity; the step of generating a second component state data block for the first component comprises generating the second component state block for the first component by a second entity; and the method includes requiring the second component state data block to be signed by the first entity and the second entity.

Clause 12. The system of Clause 8, the method including: generating a second component state data block for a second component on the blockchain, the second component state data block for the second component including first state data for the second component; and setting the link in the resource data block that corresponds to the second component to reference the first component state data block for the second component on the blockchain.

Clause 13. The system of Clause 8, where: the step of generating a resource data block that corresponds to a resource, where the resource data includes one or more links and each link corresponds to one of one or more components of the resource includes: generating a null component state data block for each of the one or more components of the resource, and for each one of the one or more components, setting the link that corresponds to the component to reference the null component state data block for the component; and the step of setting the link that corresponds to the first component to reference the first component state data block comprises linking the first component state data block to the null component state data block for the first component.

Clause 14. The system of Clause 8, where the method includes: receiving an audit request for a requested component of the resource; and responsive to the audit request: using the link corresponding to the requested component to trace the component state data blocks corresponding to the requested component; and returning the component state data in the component state data blocks corresponding to the requested component.

Clause 15. One or more computer storage media having computer executable instructions stored thereon which, when executed by one or more processors, cause the processors to execute a method for storing component state data for components of a resource, the method comprising: generating a resource data block that corresponds to a resource, where the resource data includes one or more links and each link corresponds to one of one or more components of the resource; generating a first component state data block for a first component of the resource on a blockchain, the first component state data block for the first component including first state data corresponding to the first component; and setting the link that corresponds to the first component to reference the first component state data block.

Clause 16. The computer storage media of Clause 15, where: the step of generating a resource data block that corresponds to a resource comprises generating a resource data block that corresponds to a resource by a first entity; and the step of generating a first component state data block for a first component of the resource on a blockchain includes requiring the first component state data block to be signed by the first entity.

Clause 17. The computer storage media of Clause 16, the method including: generating a second component state block for the first component, the second component state block for the first component including second state data corresponding to the first component; and linking the second component state data block to the first component state data block.

Clause 18. The computer storage media of Clause 15, where: the step of generating a resource data block that corresponds to a resource comprises generating a resource data block that corresponds to a resource by a first entity; the step of generating a second component state data block for the first component comprises generating the second component state block for the first component by a second entity; and the method includes requiring the second component state data block to be signed by the first entity and the second entity.

Clause 19. The computer storage media of Clause 15, the method including: generating a second component state data block for a second component on the blockchain, the second component state data block for the second component including first state data for the second component; and setting the link in the resource data block that corresponds to the second component to reference the first component state data block for the second component on the blockchain.

Clause 20. The computer storage media of Clause 15, where: the step of generating a resource data block that corresponds to a resource, where the resource data includes one or more links and each link corresponds to one of one or more components of the resource includes: generating a null component state data block for each of the one or more components of the resource, and for each one of the one or more components, setting the link that corresponds to the component to reference the null component state data block for the component; and the step of setting the link that corresponds to the first component to reference the first component state data block comprises linking the first component state data block to the null component state data block for the first component.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. One or more computer storage media having computer executable instructions stored thereon which, when executed by one or more processors, cause the one or more processors to execute operations comprising:
    storing, on a first blockchain, a first component state data block for a first component of a resource, the first component state data block linked to a resource data block for the resource on a second blockchain;
    generating a second component state block for the first component, the second component state block for the first component including state data corresponding to the first component; and
    linking the second component state data block to the first component state data block on the first blockchain.

2. The one or more computer storage media of claim 1, wherein the resource is provided by a resource originator entity; wherein the second component state data block for the first component is generated by a component provider entity; and wherein the operations further comprise:
    requiring the second component state data block to be signed by the resource originator entity and the component provider entity.

3. The one or more computer storage media of claim 1, wherein the resource comprises a computer hardware system and the first component comprises a hardware component of the computer hardware system.

4. The one or more computer storage media of claim 1, wherein the resource comprises an application and the first component comprises an update to the application.

5. The one or more computer storage media of claim 1, wherein the resource comprises an operating system and the first component comprises a library, a management subsystem, or a device driver.

6. The one or more computer storage media of claim 1, wherein the resource comprises a service and the first component comprises a component of the service.

7. A system comprising:
    one or more processors; and
    one or more memory devices in communication with the one or more processors, the one or more memory devices having computer-readable instructions stored thereupon that, when executed by the one or more processors, cause the one or more processors to perform operations comprising:
    storing, on a first blockchain, a first component state data block for a first component of a resource, the first component state data block linked to a resource data block for the resource on a second blockchain; and
    generating a second component state block for the first component, the second component state block for the first component including state data corresponding to the first component; and
    linking the second component state data block to the first component state data block on the first blockchain.

8. The system of claim 7, wherein the a resource is provided by a resource originator entity; wherein the second component state data block for the first component is generated by a component provider entity; and wherein the operations further comprise:
    requiring the second component state data block to be signed by the resource originator entity and the component provider entity.

9. The system of claim 7, wherein the resource comprises a computer hardware system and the first component comprises a hardware component of the system.

10. The system of claim 7, wherein the resource comprises an application and the first component comprises an update to the application.

11. The system of claim 7, wherein the resource comprises an operating system and the first component comprises a library, a management subsystem, or a device driver.

12. The system of claim 7, wherein the resource comprises a service and the first component comprises a component of the service.

13. A method comprising:
    storing, on a first blockchain, a first component state data block for a first component of a resource, the first component state data block linked to a resource data block for the resource on a second blockchain; and
    generating a second component state block for the first component, the second component state block for the first component including state data corresponding to the first component; and
    linking the second component state data block to the first component state data block on the first blockchain.

14. The method of claim 13, wherein the resource is provided by a resource originator entity; wherein the second component state data block for the first component is generated by a component provider entity; and wherein the method further comprises:

requiring the second component state data block to be signed by the resource originator entity and the component provider entity.

15. The method of claim 13, wherein the resource comprises a computer hardware system and the first component comprises a hardware component of the system.

16. The method of claim 13, wherein the resource comprises an application and the first component comprises an update to the application.

17. The method of claim 13, wherein the resource comprises an operating system and the first component comprises a library, a management subsystem, or device driver.

\* \* \* \* \*